US012647503B2

(12) United States Patent
Agrawal et al.

(10) Patent No.: US 12,647,503 B2
(45) Date of Patent: **\*Jun. 2, 2026**

(54) SURFACING NOTIFICATIONS AT A CONNECTED SECOND DEVICE MONITOR BASED ON FAVORABLE NETWORK CONDITIONS OR DEVICE RESOURCE CHARACTERISTICS OF THE CONNECTED SECOND DEVICE

(71) Applicant: MOTOROLA MOBILITY LLC, Wilmington, DE (US)

(72) Inventors: Amit Kumar Agrawal, Bangalore (IN); Krishnan Raghavan, Bangalore (IN); Vignesh Karthik Mohan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 649 days.

This patent is subject to a terminal disclaimer.

(21) Appl. No.: 18/301,913

(22) Filed: Apr. 17, 2023

(65) Prior Publication Data

US 2024/0348713 A1     Oct. 17, 2024

(51) Int. Cl.
*H04M 1/72409* (2021.01)
*H04M 1/72484* (2021.01)
(52) U.S. Cl.
CPC ... *H04M 1/72409* (2021.01); *H04M 1/72484* (2021.01)
(58) Field of Classification Search
CPC ......... H04M 1/72409; H04M 1/72484; H04M 1/724092; H04M 1/724094; H04M 1/724095; H04M 1/724097; H04M 1/724098; H04M 1/72412; H04M 1/72415; H04M 1/72418; H04M 1/72427; H04M 1/7243; H04M 1/72433; H04M 1/72436; H04M 1/72439; H04M 1/72442; H04M 1/72445; H04M 1/72448; H04M 1/72451;

(Continued)

(56) References Cited

U.S. PATENT DOCUMENTS

| | | | |
|---|---|---|---|
| 8,428,616 B2 | 4/2013 | Robbins | |
| 8,819,268 B1 * | 8/2014 | Sauer ...................... | H04L 65/00 709/248 |
| 8,948,821 B2 | 2/2015 | Newham | |

(Continued)

*Primary Examiner* — Angelica Perez
(74) *Attorney, Agent, or Firm* — Isidore PLLC

(57) ABSTRACT

A communication device, a method, and a computer program product for surfacing notifications at a second display of a connected second device based on network conditions and device characteristics at a consumer device and connected second device. The method includes receiving, by a communication device, a notification associated with consumption of content available for presentation by the communication device that interfaces with another electronic device that includes an auxiliary display capable of mirroring a user interface of the communication device. The method includes detecting one or more network conditions and device resource characteristics corresponding to the content consumption criteria encoded in the metadata. The method includes selectively enabling presentation of the content on the auxiliary display for consumption based, at least in part, by the detected one or more network conditions and device resource characteristics.

20 Claims, 13 Drawing Sheets

400 ⟍

(58) Field of Classification Search
CPC ......... H04M 1/72454; H04M 1/72457; H04M
1/7246; H04M 1/72463
See application file for complete search history.

(56) References Cited

U.S. PATENT DOCUMENTS

| | | | |
|---|---|---|---|
| 9,813,882 B1 | 11/2017 | Masterman | |
| 12,120,201 B1* | 10/2024 | Agrawal | H04L 65/80 |
| 12,333,205 B2* | 6/2025 | Agrawal | G06F 3/1423 |
| 12,445,552 B2* | 10/2025 | Agrawal | H04W 24/08 |
| 2003/0229673 A1 | 12/2003 | Malik | |
| 2012/0172019 A1 | 7/2012 | Scott | |
| 2013/0129325 A1 | 5/2013 | Robert | |
| 2013/0328878 A1* | 12/2013 | Stahl | G09G 5/005 |
| | | | 345/1.3 |
| 2014/0122302 A1 | 5/2014 | Tofighbakhish | |
| 2017/0243465 A1 | 8/2017 | Bourne, Jr. et al. | |
| 2017/0303115 A1 | 10/2017 | Shapiro et al. | |
| 2021/0067598 A1 | 3/2021 | Bhat | |
| 2021/0211757 A1 | 7/2021 | Haberman et al. | |
| 2023/0112606 A1 | 4/2023 | Verma et al. | |
| 2023/0229375 A1* | 7/2023 | Niu | G06F 3/1454 |
| | | | 345/589 |
| 2023/0247244 A1 | 8/2023 | Zlatniczki et al. | |

* cited by examiner

Figure 3:
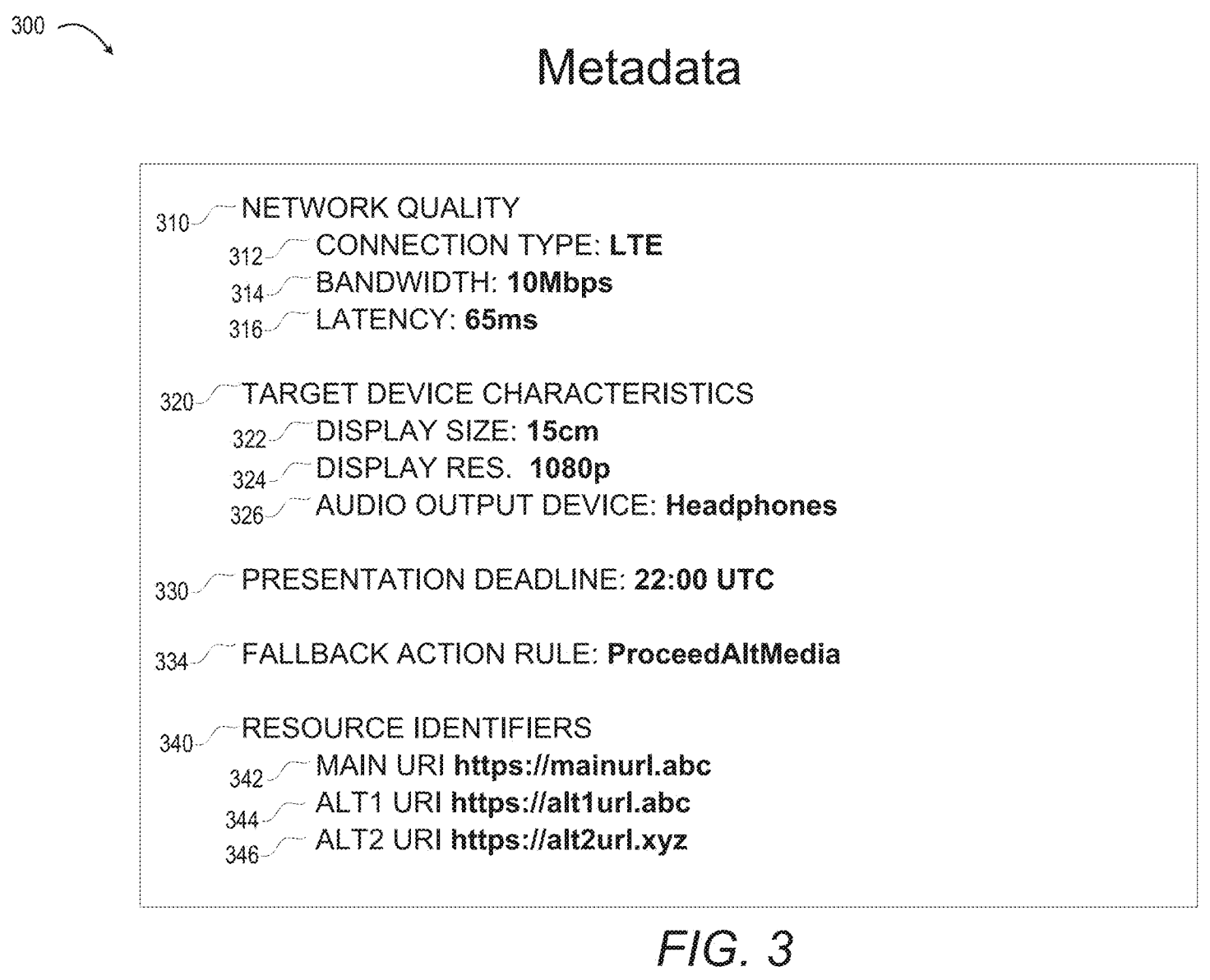

Metadata

310 — NETWORK QUALITY
312 — CONNECTION TYPE: LTE
314 — BANDWIDTH: 10Mbps
316 — LATENCY: 65ms 320 — TARGET DEVICE CHARACTERISTICS
322 — DISPLAY SIZE: 15cm
324 — DISPLAY RES. 1080p
326 — AUDIO OUTPUT DEVICE: Headphones

330 — PRESENTATION DEADLINE: 22:00 UTC

334 — FALLBACK ACTION RULE: ProceedAltMedia

340 — RESOURCE IDENTIFIERS
342 — MAIN URI https://mainurl.abc
344 — ALT1 URI https://alt1url.abc
346 — ALT2 URI https://alt2url.xyz

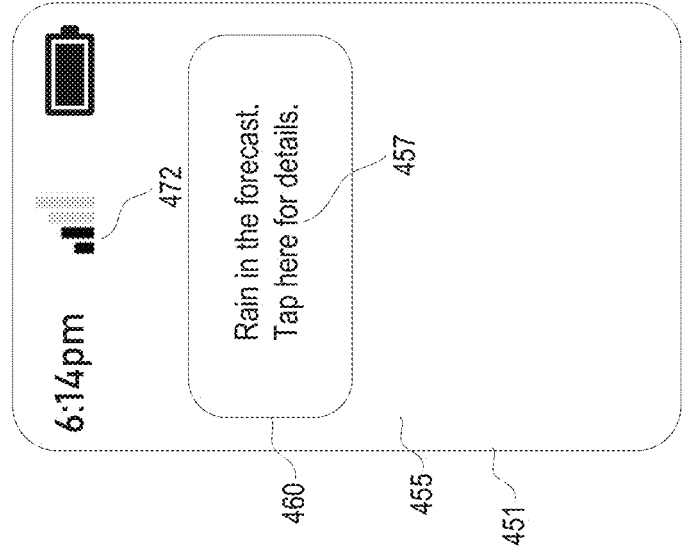
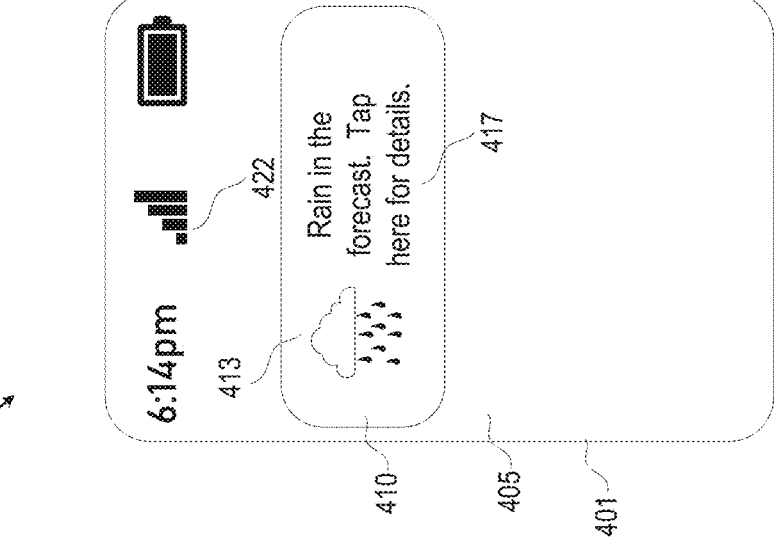
*FIG. 4*

600

Select Content for Consumption
602

Encode Content Consumption Criteria in Metadata
604

Transmit Notification to Communication Device
606

700

Receive Notification Associated with Local Consumption of Content
702

Detect one or more Network Conditions
704

Compare Current Network Conditions With Network Constraints/
Requirements/Preferences Encoded in the Metadata
706

Selectively Present Content for Consumption Based on Network
Conditions
708

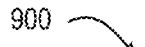

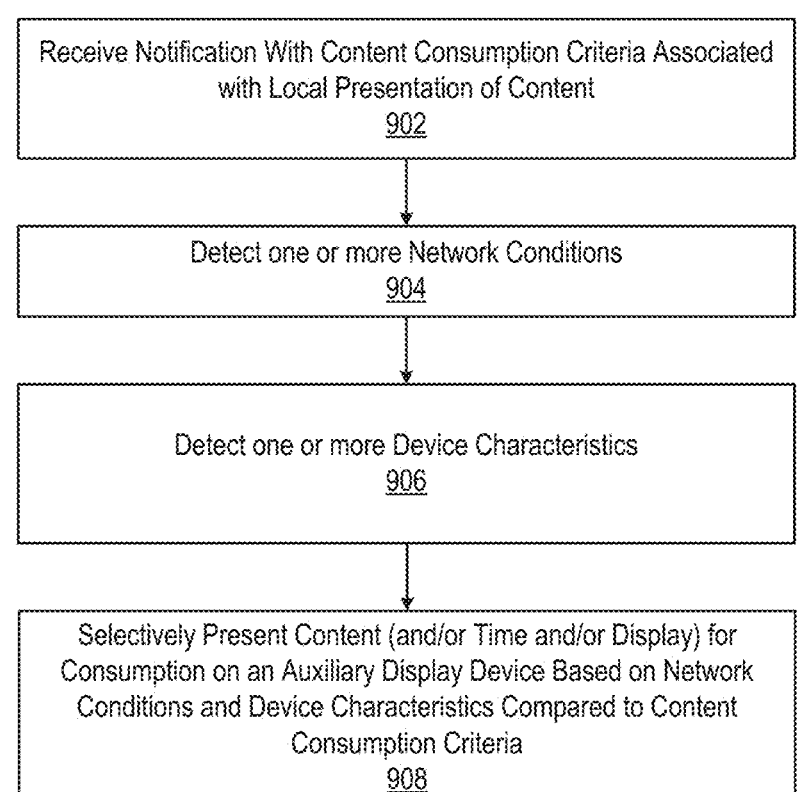

Receive Notification With Content Consumption Criteria Associated with Local Presentation of Content
902

Detect one or more Network Conditions
904

Detect one or more Device Characteristics
906

Selectively Present Content (and/or Time and/or Display) for Consumption on an Auxiliary Display Device Based on Network Conditions and Device Characteristics Compared to Content Consumption Criteria
908

Obtain Content
1202

Determine Auxiliary Display Size
1204

Size > Threshold?
1206

Y

Select Alternate Content of Higher Quality
1210

N

Present Content
1208

Present Alternate Content
1212

SURFACING NOTIFICATIONS AT A CONNECTED SECOND DEVICE MONITOR BASED ON FAVORABLE NETWORK CONDITIONS OR DEVICE RESOURCE CHARACTERISTICS OF THE CONNECTED SECOND DEVICE

BACKGROUND

1. Technical Field

The present disclosure generally relates to portable communication devices, and more specifically to communication devices that process notifications.

2. Description of the Related Art

Modern smartphones and tablet computers are network-connected devices that are equipped with high-resolution displays, as well as integrated digital cameras that capture high quality still pictures and videos. Smartphone notifications are alerts or messages that appear on a smartphone screen to provide information about events, updates, or activities related to the device, applications (apps), or services. These notifications are triggered by various sources, including apps, system updates, messaging platforms, and email services, among others.

Notifications can be configured to appear as banners, pop-ups, or lock screen messages, and may include text, images, videos, and/or sounds. They can inform users about various types of events, such as incoming calls, messages, emails, social media updates, weather alerts, reminders, and app-specific notifications like game updates, news articles, or promotional offers. Thus, notifications are used for conveying various pieces of information.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 is a table showing an example of metadata including example content consumption criteria that can be associated with notifications, according to one or more embodiments;

FIG. 4 is a diagram illustrating an example presentation of an original content notification and an alternate content notification, according to one or more embodiments;

FIG. 9 depicts a flowchart illustrating additional details of a method by which content is selectively presented on an auxiliary display device, in part based on network conditions and/or device characteristics, according to one or more embodiments;

DETAILED DESCRIPTION

Figure 1:
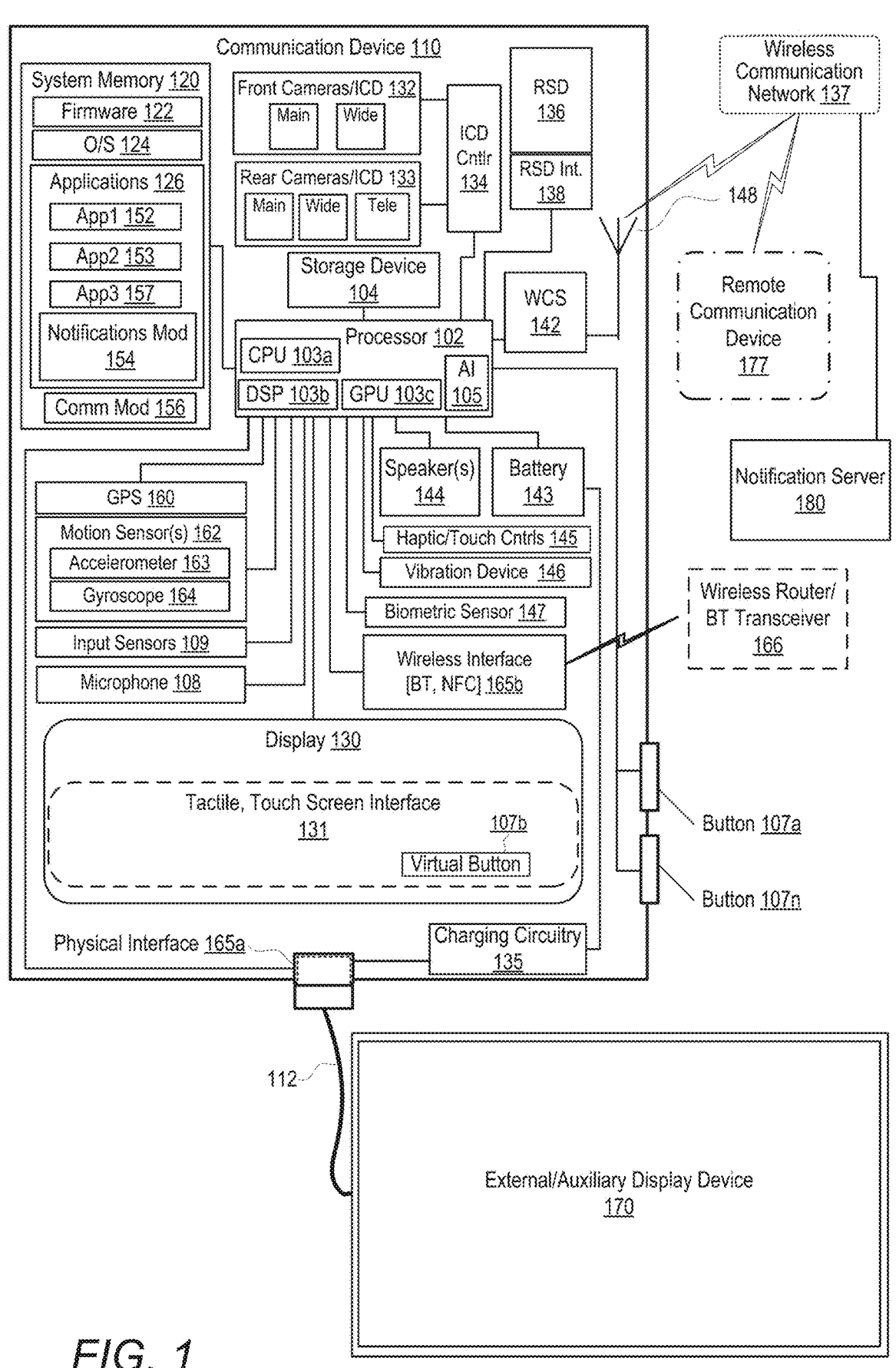
FIG. 1 depicts an example component makeup of a communication device that can be configured to surface notifications based on optimal network conditions, and within which various aspects of the disclosure can be implemented, according to one or more embodiments.

According to different aspects of the disclosure, a notification server, a communication device, various methods and computer program products enable selectively presentation of notification content on the communication device display or a connected auxiliary display based on content consumption criteria encoded in a metadata of the notification.

When a notification is presented (surfaced) on a communication device such as a smartphone of a user, the user can choose to ignore the notification or engage with it. Multiple factors play a role in determining if a user selects (engages with) or ignores a notification. One such factor is the relevance of the content itself, but equally important can be the timing of the notification. Timing can be based on a variety of factors. Since notifications often have associated content that benefits from a minimum amount of network capability, the lack of favorable network conditions can dissuade a user from engaging with the notification. While the user may plan to engage with the notification at a later time, when network conditions are more favorable, there is a chance that the user may forget to do so. Alternatively, the user may choose to engage with the notification immediately, but suboptimal network conditions may prevent the content from being rendered. This can often lead to the user clearing the notification without viewing the content. The aforementioned situations result in a missed content viewing opportunity for the user, which can adversely affect dissemination of important information, as well as potential revenue for the content provider.

Disclosed embodiments address the aforementioned problems by encoding content consumption criteria into metadata associated with notifications. The metadata, when present, enables a communication device to make strategic decisions regarding when and how to present (surface) a notification and/or associated content based on network conditions (and device capability/characteristics, in some embodiments) of the communication device. The network conditions can be dynamic, based on factors such as location of the communication device, time of day, and/or other factors. In disclosed embodiments, notifications can be deferred until network conditions improve. In a deferred notification, the notification is stored on the communication device when the notification is received, but the notification is not presented (surfaced) until the network conditions improve. The improvement can occur, as an example, when a user goes home and connects to his/her WiFi for fast internet access, as compared to the data rates provided by a cellular network. Additionally, other factors, such as a connected auxiliary display can be used as criteria for surfacing a notification on an auxiliary display instead of, or in addition to, the communication device.

According to a first described aspect of the disclosure, there is provided a computing device that includes: a communication subsystem that communicatively connects the computing device to one or more other devices via a network; a processor; and a memory storing instructions executable by the processor. When executed, the instructions cause the processor to: select content for consumption at a second device communicatively coupled to the computing device; encode, into metadata associated with the content, content consumption criteria related to at least one of a network quality and a second device capability/characteristics for presenting the content at the second device; and transmit a notification to the second device, the notification including the metadata associated with the content. The metadata configures the second device to determine at least one of (i) a timing for presenting the content for consumption at the second device and (ii) presentation parameters related to the content based on the content consumption criteria.

According to a second described aspect of the disclosure, there is provided a communication device that includes: a communication subsystem which enables the communication device to communicatively connect via a network to at least one network device providing content for local presentation at the communication device; a display; a memory storing a notifications module for surfacing notifications received during operation of the communication device; and a processor communicatively coupled to the communication subsystem, the display, and the memory and which processes instructions of the notifications module. When processed, the instructions cause the communication device to receive, from a network connected device, a notification associated with local consumption of content available for presentation by the communication device, the notification including metadata associated with the content. The metadata encodes content consumption criteria related to preferences for when and how to present the content, in part based on network conditions at the communication device. The instructions further cause the communication device to: detect one or more current network conditions; compare the current network conditions with network constraints within the content consumption criteria encoded in the metadata;

and selectively present the content for consumption at one or more of a time or in a format determined, at least in part, by the detected one or more network conditions.

According to a third described aspect of the disclosure, there is provided a communication device that includes: a communication subsystem which enables the communication device to communicatively connect via a network to at least one network device providing content for local presentation at the communication device; a first display integrated within a physical structure of the communication device; an interface by which the communication device communicatively connects to another electronic device having a second display that is configurable to be an auxiliary display for the communication device, the interface enabling the communication device to mirror a user interface of the communication device on the auxiliary display and present received notifications and content on the auxiliary display; a memory storing a notifications module for surfacing notifications received during operation of the communication device; and a processor communicatively coupled to the communication subsystem, the auxiliary display, and the memory. The processor processes instructions of the notifications module, which causes the communication device to: receive, from the network device, a notification associated with consumption of content available for presentation by the communication device, the notification including metadata associated with the content. The metadata encodes content consumption criteria related to preferences for when and how to present the content, in part based on network conditions and device resource characteristics at the communication device. The instructions cause the communication device to: detect one or more network conditions and device resource characteristics corresponding to the content consumption criteria encoded in the metadata; and selectively enable presentation of the content on the auxiliary display, in lieu of the first display, based, at least in part, on the detected one or more network conditions and device resource characteristics.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/computing devices and/or performed by the communication/computing device are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or computing device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the numbered terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 110 (FIG. 1) or notification server 230 (FIGS. 2A, 2B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of communication device 110, with specific components used to enable the device to operate in a selective notification surfacing mode, and within which various aspects of the disclosure can be implemented, according to one or more embodiments. Examples of communication device 110 include, but are not limited to, mobile devices, a notebook computer, a mobile phone, a smart phone, a digital camera with enhanced processing capabilities, a smart watch, a tablet computer, and other types of communication device that includes or can be directly connected a display capable of presenting notifications and/or associated content. It is appreciated that communication device 110 can be other types of communication devices that allow receiving and presenting of notifications.

Communication device 110 includes processor 102 (typically as a part of a processor integrated circuit (IC) chip), which includes processor resources such as central processing unit (CPU) 103a, communication signal processing resources such as digital signal processor (DSP) 103b, and graphics processing unit (GPU) 103c. Processor 102 can, in some embodiments, include high quality camera image signal processors (ISPs) (not shown) and dedicated artificial intelligence (AI) engines 105. Collectively, processor 102 supports computing, classifying, processing, transmitting and receiving of data and information, and presenting of graphical images within a display. Processor 102 is communicatively coupled to storage device 104, system memory 120, input devices (introduced below), output devices, including integrated display 130, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors that can capture images that are within the field of view (FOV) of the respective ICD 132, 133. Communication device 110 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In embodiments, one or more of the ICDs may be used for performing user identification via facial recognition.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, general purpose applications 152, 153, and 157, notifications module 154, and communication module 156. Each module and/or application provides program instructions/code that are processed by processor 102 to cause processor 102 and/or other components of communication device 110 to perform specific operations, as described herein. Descriptive names assigned to these modules add no functionality and are provided solely to identify the underlying features performed by processing of the different modules. For example, notifications module 154 can include program code to selectively surface (i.e., present on the display 130 and/or auxiliary display device 170) notifications based on network conditions and optionally, device characteristics.

Communication module 156 within system memory 120 enables communication device 110 to communicate with wireless communication network 137 and with other devices, such as remote communication device 177 and notification server 180, via one or more of audio, text, and video communications. Communication module 156 can support various communication sessions by communication device 110, such as audio communication sessions, video communication sessions, text communication sessions, receiving notifications, exchange of data, and/or a combined audio/text/video/data communication session.

In one or more embodiments, communication device 110 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 153, 154, 156, 157) stored thereon. Processor 102 can access RSD 136 to provision communication device 110 with program code that, when executed/processed by processor 102, the program code causes or configures processor 102 and/or generally communication device 110, to provide the various selective notification surfacing functions described herein. The RSD 136 can be an example of a non-transitory or tangible computer readable storage device.

Communication device 110 includes an integrated display 130 which incorporates a tactile, touch screen interface 131 that can receive user tactile/touch input. As a touch screen device, integrated display 130 allows a user to provide input to or to control communication device 110 by touching features within the user interface presented on display screen. Tactile, touch screen interface 131 can be utilized as an input device. The touch screen interface 131 can include one or more virtual buttons, indicated generally as 107*b*. In embodiments, when a user applies a finger on the touch screen interface 131 in the region demarked by the virtual button 107*b*, the touch of the region causes the processor 102 to execute code to implement a function associated with the virtual button. In some implementations, integrated display 130 is integrated into a front surface of communication device 110, while the higher quality ICDs are located on a rear surface. The specific physical and functional characteristics of integrated display 130, e.g., screen size, aspect ratio, supported resolution, image quality, video display rate, etc., can vary and are known to or accessible by the processor 102.

Communication device 110 also includes a physical interface 165*a*. Physical interface 165*a* of communication device 110 can serve as a data port and can be coupled to charging circuitry 135 and device battery 143 to enable recharging of device battery 143.

As provided by the illustrative embodiment, communication device 110 can also include external display device 170, which is communicatively coupled to communication device 110 via a cable 112 attached to physical interface 165*a*, or by a wireless interface 165*b*. External display device 170 can be one of a wide variety of display screens, monitors, or devices, such as a liquid crystal display (LCD) and an organic light emitting diode (OLED) display. In one or more embodiments, external display device 170 can be a component of a second electronic device, such as a laptop or desktop computer, that includes separate processing functionality and network connectivity. In one or more embodiments, the external display device 170 can be used as a second or an auxiliary display device to display notifications received for presenting to a user of the communication device 110, and the external display device 170 can be selectively used instead of, or in addition to, the display 130 of the communication device 110.

Communication device 110 can further include microphone 108, one or more output devices such as speakers 144, and one or more input buttons 107*a*-107*n*. Microphone 108 can also be referred to as an audio input device. In some embodiments, microphone 108 may be used for identifying a user via voiceprint, voice recognition, and/or other suitable techniques. Input buttons 107*a*-107*n* may provide controls for volume, power, and ICDs 132, 133. Additionally, communication device 110 can include input sensors 109 (e.g., enabling gesture detection by a user).

Communication device 110 further includes haptic touch controls 145, vibration device 146, fingerprint/biometric sensor 147, global positioning system (GPS) device 160, and motion sensor(s) 162. Vibration device 146 can cause communication device 110 to vibrate or shake when activated. Vibration device 146 can be activated during an incoming call or message in order to provide an alert or notification to a user of communication device 110. In one or more embodiments, vibration device 146 can be used as an alert when presenting a notification to a user. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user, and in some embodiments, the biometric sensor 147 can supplement an ICD (camera) for user detection/identification.

GPS device 160 can provide time data and location data about the physical location of communication device 110 using geospatial input received from GPS satellites. Motion sensor(s) 162 can include one or more accelerometers 163 and gyroscope 164. Motion sensor(s) 162 can detect movement of communication device 110 and provide motion data to processor 102 indicating the spatial orientation and movement of communication device 110. Accelerometers 163 measure linear acceleration of movement of communication device 110 in multiple axes (X, Y and Z). Gyroscope 164 measures rotation or angular rotational velocity of communication device 110. Communication device 110 further includes a housing that contains/protects the components internal to communication device 110.

Communication device 110 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. WCS 142 and antennas 148 allow communication device 110 to communicate wirelessly with a wireless communication network 137 via transmissions of communication signals to and from network communication devices, such as base stations or cellular nodes, of wireless communication network 137. In one or more embodiments, the WCS 142 may determine and/or compute various communications parameters, including, but not limited to, received signal strength, error rate, bandwidth, channel usage, throughput, latency, connection type, and/or other communications parameters. The communications parameters can be used as inputs to determining a network quality value (NQV). The NQV can be used as a criterion to determine the appropriate content and/or a time for displaying content associated with a notification.

Wireless communication network 137 further allows communication device 110 to wirelessly communicate with remote communication device 177, which can be similarly connected to wireless communication network 137. Communication device 110 can also communicate wirelessly with wireless communication network 137 via communication signals transmitted by short range communication device(s) to and from an external WiFi/BT transceiver device 166, which is communicatively connected to wireless communication network 137. In one or more embodiments, wireless communication network 137 can be interconnected with a wide area network that can include one or more devices that support exchange of audio and video messages, data, and/or other communication between communication device 110 and remote communication device 177.

Wireless interface 165b can be a short-range wireless communication component providing Bluetooth, near field communication (NFC), and/or wireless fidelity (Wi-Fi) connections. In one embodiment, communication device 110 can receive Internet or Wi-Fi based calls via wireless interface 165b. In one embodiment, communication device 110 can communicate wirelessly with external wireless transceiver device 166, such as a WiFi router or BT transceiver, via wireless interface 165b. In an embodiment, WCS 142, antenna(s) 148, and wireless interface 165b collectively provide communication interface(s) of communication device 110.

Figure 2A:
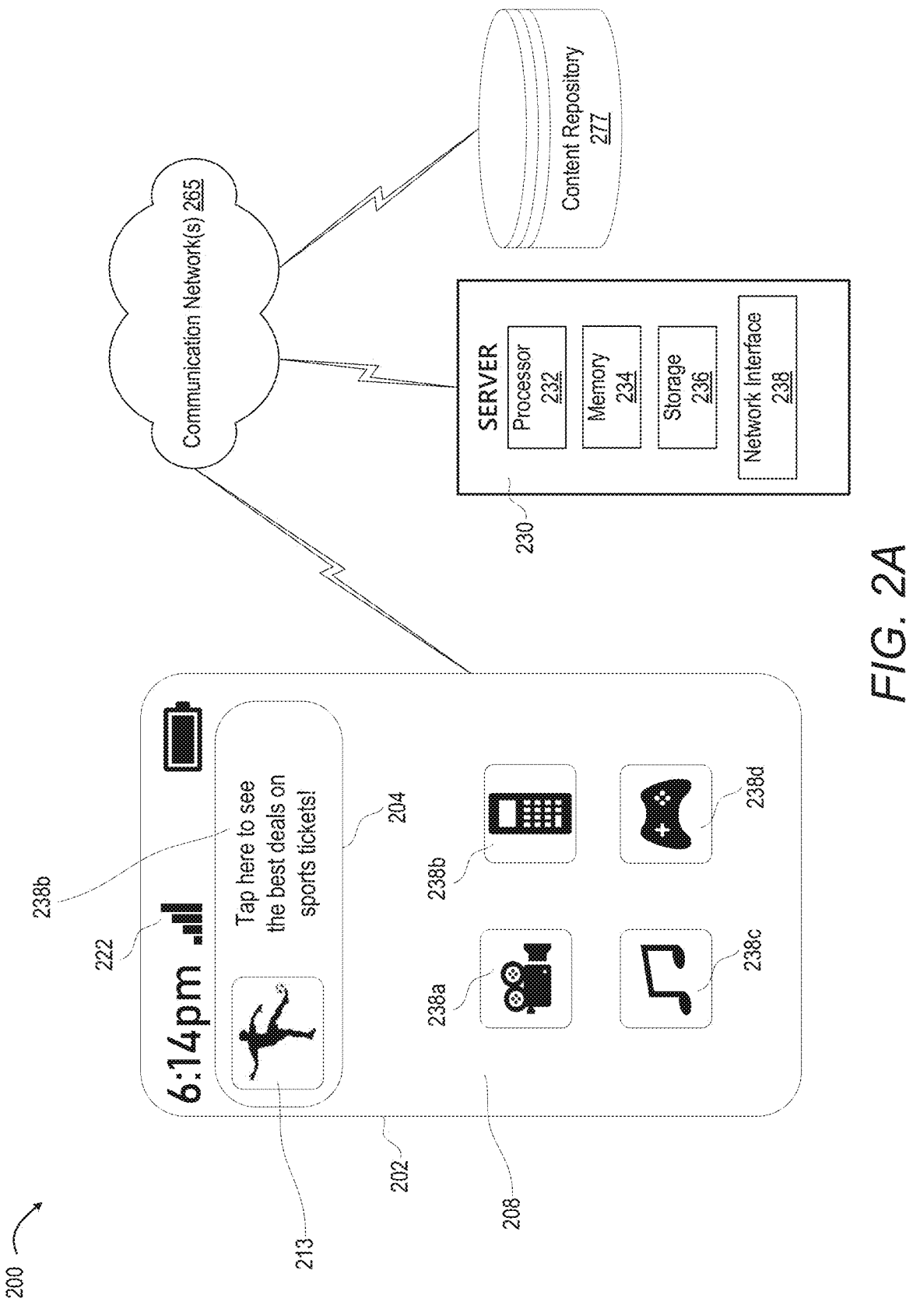
FIG. 2A is a diagram illustrating an environment that enables a notification to be generated by an external device and presented on an example communication device, according to one or more embodiments.

FIG. 2A is a diagram illustrating an environment 200 that enables a notification to be generated by an external device and presented on an example communication device 202, according to one or more embodiments. Communication device 202 can be an implementation of communication device 110 (FIG. 1) having the same or similar components and providing the same or similar functions as communication device 110. Display 208 of communication device 202 can render a variety of application icons that correspond to applications, indicated as 238a-238d. The applications can include media players, games, messaging applications, and more. Communication device 202 can be configured to present (surface) notifications, such as shown at 204. Notifications 204 can include graphical elements such as indicated at 213. The graphical element can include an icon, animated GIF, video thumbnail, and/or other multimedia element. Furthermore, notifications 204 can have additional content associated with them. For example, when a user presses a graphical element such as 213 of example notification 204, the input can cause the communication device 202 to present additional content, such as a video clip, audio clip, and/or images. The communication device 202 can include a signal strength indicator 222. The signal strength indicator 222 can indicate strength of a cellular signal, WiFi signal, or other suitable signal that may be utilized by the communication device 202 to access the additional content.

The communication device 202 is configured to download and present content, such as video, text, and audio data, for consumption via download from communication network(s) 265. Communication device 202 connects to server 230 via communication network(s) 265. Communication network(s) 265 can include the Internet, a local area network (LAN), wide area network (WAN), and/or other suitable networks. Server 230 can be a notification server at which the notifications are generated with embedded metatags, as described herein. As shown by the illustrated embodiment, server 230 can be a video content providing server (or video server). The video server may utilize one or more protocols, including but not limited to, Hypertext Transfer Protocol (HTTP), Real-time Transport Protocol (RTP), Real Time Streaming Protocol (RTSP), and/or other protocols to stream video content to communication device 202. The video content can be in a variety of formats, including, but not limited to, HTTP Live Streaming (HLS), Web Real-Time Communications (WebRTC), Dynamic Adaptive Streaming over HTTP (MPEG-DASH), MPEG-4, H.263, H.264, and/or other suitable formats and/or combinations thereof. In one or more embodiments, server 230 may serve video content from content repository 277. The content repository 277 can include a networked database of content assets. The content assets can include, but are not limited to, video assets, audio assets, image assets, and/or other types of media assets. In some embodiments, server 230 may perform transcoding of assets in the content repository 277. In one or more embodiments, the transcoding can be performed to create alternate versions of the video assets for use in communicating the content to a user device during suboptimal network conditions.

Server 230 can include a processor 232, that is coupled to memory 234, storage 236, and network interface 238. Processor 232 may include a multicore processor, and in some embodiments, the server 230 can include multiple processors. Memory 234 may include dynamic random-access memory (DRAM), static random-access memory (SRAM), magnetic storage, and/or a read only memory such as flash, optical storage, or other suitable memory. In one or more embodiments, memory 234 includes a non-transitory computer-readable medium.

Storage 236 may include one or more magnetic storage devices such as hard disk drives (HDDs). Storage 236 may additionally include one or more solid state drives (SSDs). The network interface 238 may include an Ethernet interface, coax interface, fiber interface, wireless interface, and/ or other suitable interfaces for enabling the server 230 to communicate via communication network(s) 265. In one or more embodiments, the server 230 may be implemented in a virtualized environment. The virtualized environment can include one or more virtual machines and/or containers.

In accordance with the first aspect of the disclosure, the processor 232 is communicatively connected to each of the other components and performs the previously introduced features of a notification (and/or content) server. The processor 232 encodes metadata within generated notifications, where the metadata provides specific content consumption criteria that controls the timing for surfacing notifications by the communication device 202. Server 230 is communicatively connected to communication device 202, which is the second device. In one or more embodiments, to encode the content consumption criteria, the processor determines a presentation deadline for surfacing the notification to the second device (202) and incorporates the presentation deadline within the metadata.

In one or more embodiments, the processor 232 further identifies at least one fallback action rule to be followed by the second device in response to not presenting the notification before expiration of the presentation deadline. The processor 232 incorporates the fallback action rule within the metadata. In one or more specific implementations, to encode the fallback action rule, the processor includes one or more of abort, proceed-regardless, and proceed with surfacing alternate media as a fallback action to implement in response to not presenting the notification before expiration of the presentation deadline.

In one or more embodiments, to encode the second device capability in the metadata, the processor 232: determines one or more presentation parameters associated with presentation of the notification or associated content, the presentation parameters comprising recommended characteristics for at least one of display size, a display resolution, and an audio output device selection; and provides an indication of the one or more presentation parameters within the metadata.

In accordance with the second aspect of the disclosure, as implemented by communication device 110, to selectively present the content for consumption, the processor 102 determines a network quality value and delays presentation of the content until the network quality value exceeds a predetermined minimum quality threshold. In one or more embodiments, to selectively present the content for consumption, the processor 102 identifies from the metadata that a second version of the content that has lower network requirements is available and determines that a current network quality value is below a first threshold quality value to support successful presentation of a full version of the content. The processor 102 then selects the second version of the content for presentation, based on the current network quality value being below the first threshold quality value and a current time being an appropriate time for surfacing the content for user consumption. In one or more implementations of the embodiments, the second version of the content comprises one or more of a smaller version of the content, a text version of the content, a less bandwidth intensive version of the content, and a less resource intensive version of the content.

In one or more embodiments, to selectively present the content for consumption, the processor 102 identifies a time corresponding to the known times when the network quality value of the communication device 110 exceed a predetermined threshold, and the processor 102 presents the content at the identified time. In one or more embodiments, to selectively present the content for consumption, the processor 102 applies a fallback action rule for the content, where the fallback action rule specifies one or more actions to be executed by the processor 102 in response to reaching a presentation deadline.

In one or more implementations of the embodiments, a display interface is communicatively coupled to the processor and enables the communication device to connect to a second display device. The processor 102 selectively presents the notification on the second display device based on the content consumption criteria encoded within the metadata. In one or more related embodiments, to determine when to selectively present the notification on the second display device, the processor 102 receives, within the metadata, rendering criteria for displays that are best for rendering the content, and determines which of a local display and the second display device provides the rendering criteria identified by the metadata. The processor 102 outputs the content on a selected one of the local display and the second display device that provides the rendering criteria. In one or more embodiments, in response to the rendering criteria indicating that the content is better rendered on a larger display, the processor 102 selects a larger of the local display and the second display device and renders the notification and the associated content on the larger display.

Figure 2B:
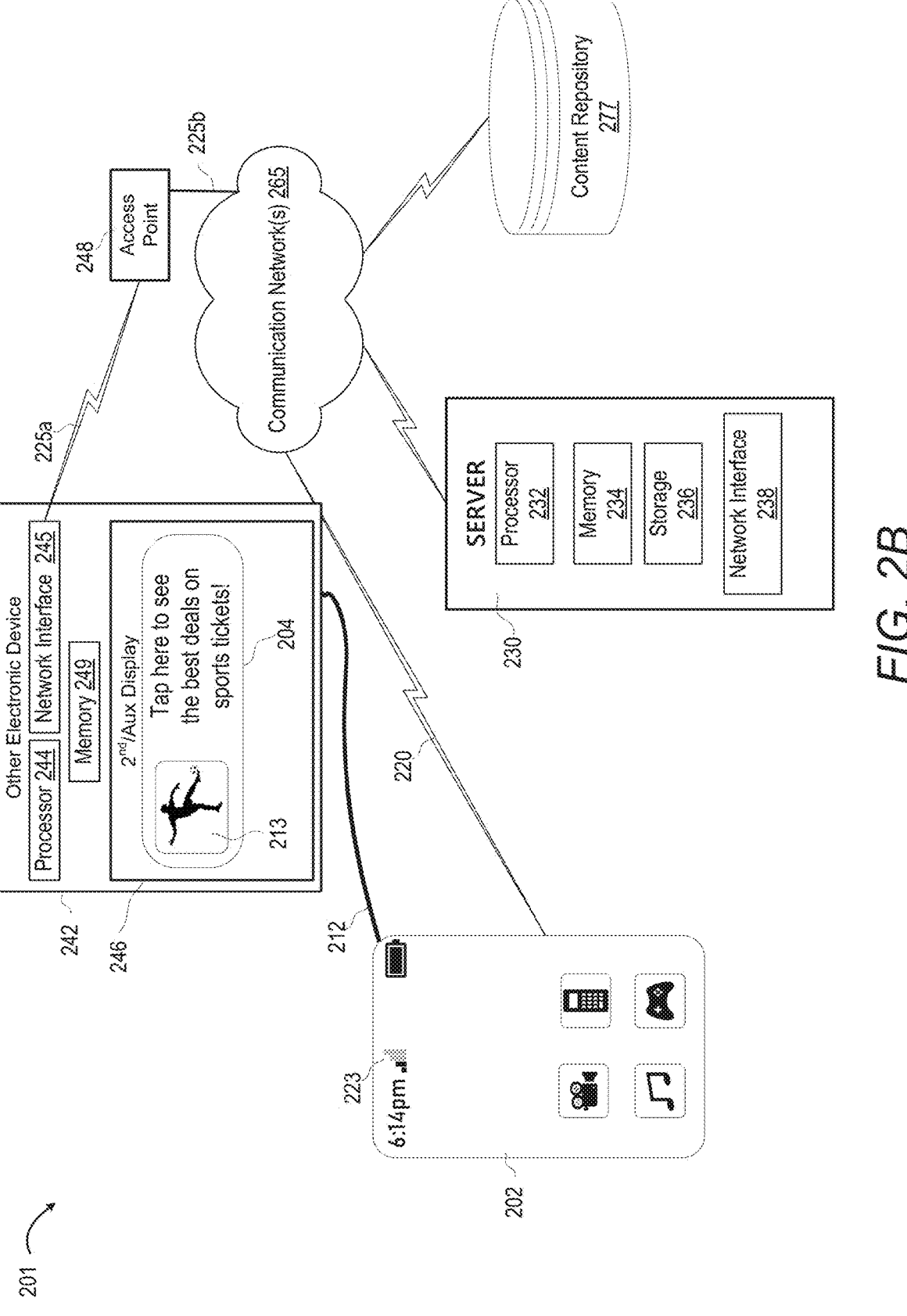
FIG. 2B is a diagram illustrating the communication device connected to another electronic device with a second display screen and which has a direct connection to the network enabling selective downloading and surfacing of notification content at the second display in place of the communication device, according to one or more embodiments.

FIG. 2B is a diagram illustrating the communication device connected to another electronic device with a second display screen and which has a direct connection to the network enabling selective downloading and surfacing of notification content at the second display in place of the communication device, according to one or more embodiments. FIG. 2B shows a second environment 201 that includes the communication device 202 connected to another electronic device 242 via connection 212. Electronic device 242 includes processor 244, network interface 245, and system memory 249. The processor 244 is communicatively coupled to memory 249 and network interface 245. Memory 249 can include dynamic random-access memory (DRAM), static random-access memory (SRAM), Flash memory, magnetic storage, and/or other suitable memory types. In one or more embodiments, connection 212 is a wired connection that utilizes HDMI, USB, Ethernet, DisplayPort, and/or other suitable protocols. Electronic device 242 has an indirect connection from network interface 245 to the communication network(s) 265 via access point 248. which can be utilized to download and surface notification content instead of electronic device 242 receiving a mirrored or forwarded version of the notification content from the communication device 202, according to one or more embodiments. Access point 248 can be a wireless access point, wired access point, and/or other suitable type of access point. In environment 201, the other electronic device 242 can be a laptop computer, tablet computer, wearable computer, smart television, computer monitor, projector, and/or other suitable electronic device that includes or has a connection to second display 246. According to one or more features of the disclosure, the criteria for determining when and where to present notification 204 can be based on a network quality value for the other electronic device 242, as well as device characteristics of electronic device 242. In second environment 201, communication device 202 has a weak signal, as indicated by signal strength indicator 223. Electronic device 242 is presumed to have a high(er) bandwidth connection 225a-225b to network 265. Accordingly, when communication device 202 has poor network quality at a certain point in time at which the notification is received and/or the notification is to be surfaced on a display to present to the user, the processor of communication device 202 determines that download/retrieval and presentation of the content via the reduced-bandwidth network connection 220 of communication device 202 would make for a subpar viewing experience of the notification on the communication device 202. The processor 102 further determines that the bandwidth required for the content can be met by the bandwidth available to the electronic device 242 via direct network connection 225a-225b. The processor 102 signals/triggers second processor 244 of electronic device 242 to complete the download of notification content via second connection 225a-225b and present the notification content on auxiliary display 246. Thus, according to the disclosed embodiments, processor 102 can automatically trigger presentation of the notification on the auxiliary display 246 of the other electronic device 242 instead of the display 208 of communication device 202.

FIG. 3 is a table showing an example of metadata 300 including content consumption criteria that is associated with notifications, according to one or more embodiments. In one or more embodiments, the content consumption criteria relate to preferences for when and how to present the content, in part based on network conditions at the communication device. In one or more embodiments, the metadata 300 is prepended or appended to, or otherwise associated with, a notification. The metadata 300 can include multiple sections. As shown, the metadata 300 can include a network quality section 310. The network quality section can include a connection type field 312. In one or more embodiments, the connection type field can include an enumeration indicating a connection type, including, but not limited to, cellular, satellite, WiFi, Bluetooth, and/or other connection type. In some embodiments, a detailed connection type can be included. The detailed connection type indicates a specific subclass of a connection type. As an example, a cellular connection subtype can include LTE, 5G, etc. Similarly, a WiFi connection subtype can include 2.4 GHz. 5 GHZ, 6 GHZ, etc. The network quality section can include a bandwidth field 314. The bandwidth field 314 can include a bandwidth, in megabits per second (Mbps) or other suitable units. The network quality section can include a latency field 316. The latency field 316 can include a latency, in milliseconds (ms) or other suitable units.

The metadata 300 can include a target device capability/characteristics section 320. The target device is the device on which the notification and/or associated content is to be displayed. The target device capability/characteristics section 320 can include one or more attributes of a display that are preferred for presenting (surfacing) a notification and/or its associated content. The target device characteristics section 320 can include a display size field 322. The display size field 322 can include a preferred display size, in centimeters (cm) or other suitable units. In one or more embodiments, the display size field 322 indicates a minimum preferred display size. The target device characteristics section 320 can include a display resolution field 324. The display resolution field 324 can include a preferred display resolution. In one or more embodiments, the display resolution can be an enumerated type. In some embodiments, the display resolution can be indicated as an integer indicating a number of rows or columns of the display. In one or more embodiments, the target device capability can include a minimum processor and/or available memory resource field. The target device capability can determine whether a target device has at least a threshold processing capability (e.g., processor speed and available processing resource) or a threshold amount of memory available for processing the notification. The target device characteristics section 320 can include an audio output device field 326. The audio output device field 326 can include a preferred audio output device for the notification and/or associated content. In one or more embodiments, the preferred audio output device field can include an enumeration indicating an audio output device, including, but not limited to, headphones, built-in speaker, external Bluetooth speaker, and/or other suitable audio output devices. Other capabilities/characteristics that can be used in one or more embodiments can include refresh rate, brightness, luminance, contrast ratio, aspect ratio, and/or viewing angle.

According to one or more embodiments, the metadata 300 can include a presentation deadline 330. The presentation deadline 330 can include a date/time by which the notification should be presented. In one or more embodiments, the presentation deadline 330 identifies a preferred latest time for presentation of the notification. In one or more embodiments, the time is specified in GPS seconds, Unix seconds, or other suitable date/time format.

In one or more embodiments, the metadata can include a fallback action rule field 334. The fallback action rule field 334 can include an action/response the communication device should take regarding a notification and/or associated content in the event that the network quality conditions are not met by the time specified in the presentation deadline 330. In one or more embodiments, the fallback action rule field 334 can include an enumeration indicating an action of abort, proceed-regardless, and proceed with surfacing alternate media. The fallback action rule of 'abort' causes disclosed embodiments to discard a notification if the network quality conditions specified in network quality section 310 are not met. The fallback action rule of 'proceed-regardless' causes communication device 110 to surface the notification, even though the network quality conditions specified in network quality section 310 are not met. The fallback action rule of proceed with surfacing alternate media (indicated as 'ProceedAltMedia' in metadata 300) causes communication device 110 to present an alternate version of the notification if the network quality conditions specified in network quality section 310 are not met. In one or more embodiments, the alternate version of the notification is generated by the notification/content server and made available for access in lieu of the original content. In one or more embodiments, the alternate version can be a less network-intensive version of an original notification. Examples of an alternate version of a notification can include, but are not limited to, a text-only version of an original notification that contains one or more graphic elements, a notification that is associated with image or video content of a lower resolution than that associated with an original notification, and so on. The metadata 300 can include a resource identifiers section 340. The resource identifiers section 340 can include one or more universal resource identifiers (URIs) that can include a uniform resource locator, and/or other relevant data for accessing a notification and/or associated content such as a video, audio, image, and/or other media file or stream. In the example of FIG. 3, the resource identifiers section 340 includes a main URI 342 and two alternative URIs, indicated as 344 and 346. In one or more embodiments, a tiered approach is used for determining which version of content to use. When the network quality conditions specified in network quality section 310 are satisfied, the original notification and/or associated content is presented, and the main URI 342 is used to retrieve the content for presentation. In one or more embodiments, when the network quality conditions specified in network quality section 310 are not satisfied, but above a second predetermined threshold, then the first alternate notification and/or associated content is presented, and the first alternate URI 344 is used to retrieve the content for presentation. Similarly, when the network quality conditions specified in network quality section 310 are also below the second predetermined threshold, then the second alternate notification and/or associated content is presented, and the second alternate URI 346 is used to retrieve the content for presentation. As an example, the main URI 342 can reference content with a resolution of 1080p, which is well suited for a fast network connection, the first alternate URI 344 can reference content with a resolution of 480p, which is better suited for slower network connections, and the second alternate URI 346 can reference content with static images, text, and/or other elements that present satisfactorily in slow and/or unreliable network conditions. Thus, in one or more embodiments, the alternate URIs 344 and 346 can reference content that has reduced network bandwidth requirements. In one or more embodiments, an alternate URI can represent a second version of content. In one or more implementations of these embodiments, the second version of the content can include one or more of a smaller version of the content, a text version of the content, a less bandwidth intensive version of the content, and a less resource intensive version of the content. While the resource identifiers section 340 indicates one main URI and two alternate URIs, in practice, there can be more or fewer URIs specified in the resource identifiers section 340.

In an alternate embodiment, in which content is selected based on device capabilities, i.e., where the network parameters are not a bottleneck to surfacing any of the notification content, a better alternate version can actually be provided that has a more expansive version or a higher quality of the content. For example, the original version may be a lower resolution file or video (1080p) than the alternate version (2160p or 4K) designed for presenting on a higher quality display, such as the auxiliary display, where the original version is more appropriate for presentation on the display of the communication device 110.

FIG. 4 is a diagram 400 illustrating an example of a notification with graphical elements and text elements, and an alternate content notification with text elements only, according to one or more embodiments. Communication device 401 can be an implementation of communication device 110 (FIG. 1) having the same or similar components and providing the same or similar functions as communication device 110. Communication device 401 includes display 405. Display 405 renders notification 410 which includes graphical element 413. In one or more embodiments, graphical element 413 can include an image, animated GIF, video thumbnail, or other multimedia element. Notification 410 further includes a text portion, indicated at 417. Display 405 also renders a signal strength indicator 422 indicating a strong network connection with all four bars rendered in dark shading.

Communication device 451 can be an implementation of communication device 110 (FIG. 1) having the same or similar components and providing the same or similar functions as communication device 110. Communication device 451 includes display 455. Display 455 renders a signal strength indicator 472 indicating a weaker network connection than that of communication device 401, with only two out of four bars rendered in dark shading. Accordingly, due to decreased network quality, the communication device 451 presents notification 460 on display 455, which only includes a text portion 457. The (alternate) notification 460 is selected (by device processor) for presentation instead of notification 410 because of the weaker network condition affecting communication device 451, as notification 460 requires less network bandwidth than notification 410. Accordingly, the selection and presentation of notification 460 provides an improved user experience in suboptimal (weaker) network conditions.

Figure 5:
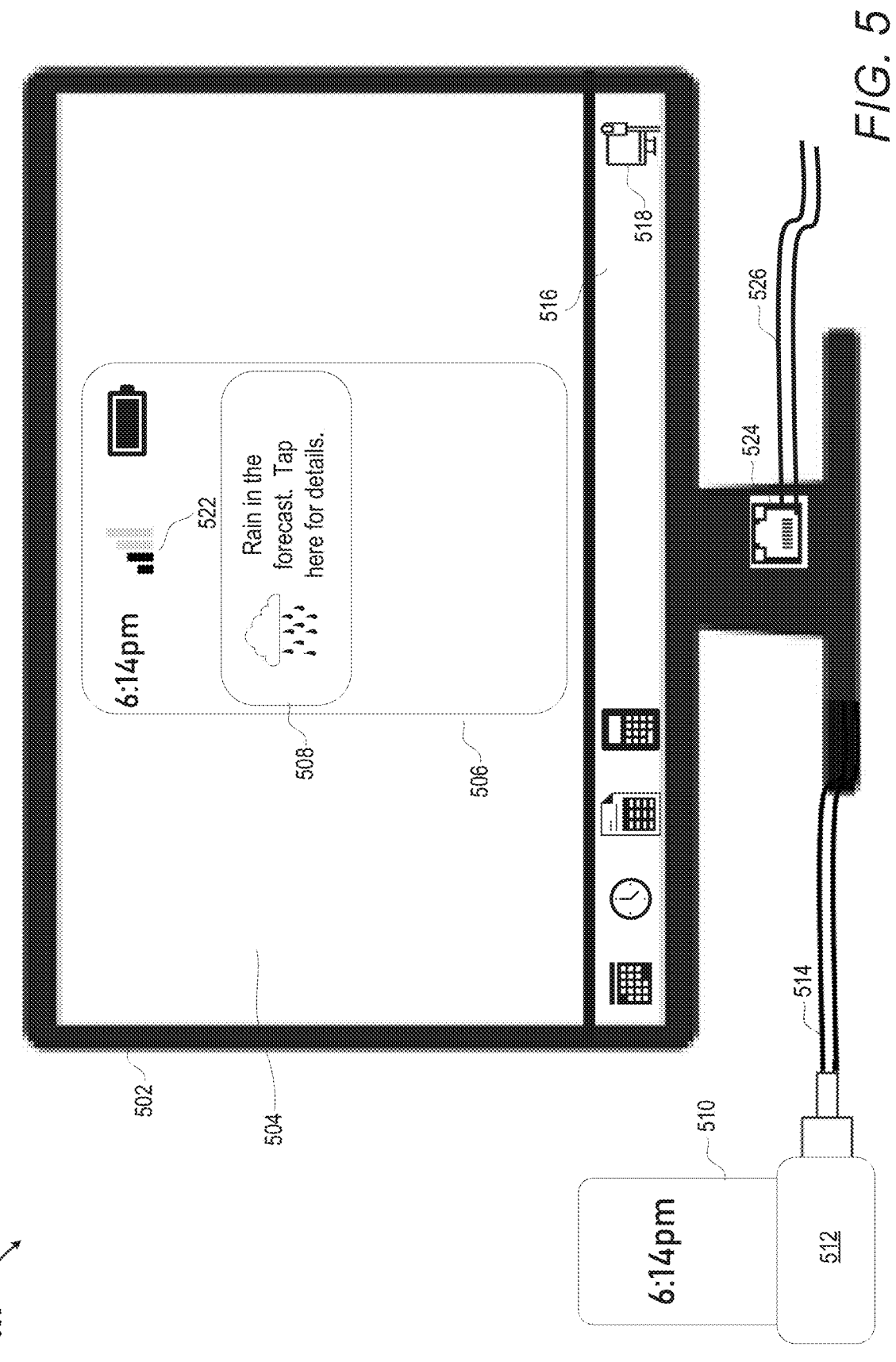
FIG. 5 is a diagram illustrating selective presentation of a notification on an auxiliary display device in lieu of a communication device, based on one or more device network conditions and/or device characteristics, according to one or more embodiments.

FIG. 5 is a diagram 500 illustrating selective presentation of a notification on an auxiliary display device in lieu of a communication device, based on one or more device network conditions and/or device characteristics, according to one or more embodiments. Screen mirroring is a technology that allows for displaying the content of one device, such as a smartphone, tablet, or computer, on another device, such as a TV, monitor, or projector. The process of screen mirroring involves transmitting the display images from one device to another. Disclosed embodiments include an interface by which the communication device communicatively connects to another electronic device having a second display that is configurable to be an auxiliary display for the communication device. The interface enables the communication device 510 to mirror a user interface of the communication device 510 on the auxiliary display 504 and present received notifications and content on the auxiliary display. Communication device 510 is placed in docking station 512. Communication device 510 can be an implementation of communication device 110 (FIG. 1) having the same or similar components and providing the same or similar functions as communication device 110. The docking station 512 may be coupled to an auxiliary display device 502 via a wired interface 514. The wired interface 514 can include a USB (Universal Serial Bus) connection, Ethernet connection, optical connection, and/or other suitable wired connection. Alternatively, the docking station 512 may be coupled to auxiliary display device 502 via a wireless connection protocol such as Bluetooth, Zigbee, infrared, and/or other suitable wireless connection protocol.

The display device 502 can include, but is not limited to, a laptop computer, tablet computer, computer monitor, smart television, and/or other suitable display device. Display device 502 includes a display 504. The user interface of the communication device 510 can be presented on the display device 502, as indicated at 506. A notification 508 can be displayed on the user interface. The user interface 506 can also show a signal strength indicated as 522 for the communication device 510. According to one or more embodiments, as illustrated by the figure, display device 502 can have its own network connection 524, with a wired connection 526 that can be connected to a corresponding network access port within a premises (not shown) to enable a fast network connection. While shown as providing a physical/wired connection, alternate embodiments providing a wireless connection can also be supported. In the example, network icon 518 in the taskbar section 516 of the display 504 indicates presence of an Ethernet network connection. Accordingly, a fast wired connection is available, which is sufficient to render a notification 508 that includes graphic elements and/or other associated video, audio, and/or image content, without being limited by the lower network bandwidth of the communication device. In one or more embodiments, the communication device 510 receives network information from display device 502 and determines a network quality value for the display device 502, which serves as an auxiliary display device. As illustrated in the example, the signal strength of the communication device 510 is indicated as not being full strength (only two of four bars are dark shaded). According to one or more of the disclosed embodiments, the communication device 510 is able to evaluate the network quality of the display device 502, which has a wired network connection, as indicated by network icon 518. In one or more embodiments, the metadata encoded within the notification identifies a display characteristic for independent download of content, which characteristic is met by the auxiliary display. For example, the display characteristic can include the display device being separately connected to the network or the content server, with the connection having sufficient bandwidth and/or a high enough network quality level.

In one or more embodiments, device characteristics for display device 502 are also considered in the decision-making process for presenting notifications. As an example, a notification that includes 4K video content can include metadata that indicates a preference for a display screen size exceeding 54 cm (diagonally measured) and supporting 4K output display. When a display device meeting those criteria is attached/coupled to the communication device 510, the notification can be presented (surfaced) on the display device instead of, or in addition to, being presented on communication device 510 directly.

Accordingly, to selectively present the notification on the auxiliary display, the processor of the communication device: defers presentation of the notification while the other electronic device is not connected to the communication device; identifies, via the interface, when the other electronic device is connected to the communication device; and renders the notification on the auxiliary display of the other electronic device in response to identifying connection of the other electronic device.

With the provided configuration of the communication device coupled to display device, which is in turn directly connected to the network, various different embodiments can selectively enable presentation of the content on the auxiliary display, in lieu of the first display, based, at least in part, on the detected one or more network conditions and device resource characteristics. For example, in one or more embodiments, in response to the rendering criteria indicating that the content is better rendered on a larger display, the communications device selects a larger of a local display and a second display device; and renders the notification and associated content on the larger display.

In one or more embodiments, the introduced other electronic device (e.g., electronic device 242, FIG. 2 or display device 502. FIG. 5) comprises a second processor and a communication link to the at least one network device that can be selectively utilized for accessing and presenting the content. To selectively present the content on the auxiliary display, the processor identifies that a network quality value of the communication device is below a threshold quality value required to present the content. The processor receives a second network quality value for the communication link between the other electronic device and the at least one network device and compares the second network quality value with a threshold quality value. The processor then triggers the second processor of the other electronic device to directly access the content from the at least one network device and present the content on the auxiliary display, in response to the second network quality value being greater than the threshold quality value, while the network quality value of the communication device is below the threshold quality value.

In one or more embodiments, the processor delays presentation of the content until at least one of the network quality value and the second network quality value exceeds a predetermined threshold. In aspects, the metadata identifies a display characteristic that is met by the auxiliary display, and to selectively present the notification on the auxiliary display, the processor: defers presentation of the notification while the other electronic device is not connected to the communication device; identifies, via the interface, when the other electronic device is connected to the communication device; and renders the notification on the auxiliary display of the other electronic device in response to identifying connection of the other electronic device. In aspects, the processor: identifies a preferred time for presentation of the notification; triggers retrieval of the notification and associated content utilizing the communication link while a second network quality value for the communication link exceeds a predetermined threshold at the preferred time; and renders the notification on the auxiliary display of the other electronic device, further in response to determining that the second network quality value exceeds the predetermined threshold at the preferred time.

In one or more embodiments, to selectively present the content on the auxiliary display, the processor: determines if a specific application is executing on the other electronic device; defers presentation of the content in response to determining that the specific application is executing; and in response to detecting a termination event for the specific application, presents the content on the auxiliary display. In aspects, to selectively present the content on the auxiliary display, the processor: selects a second version of the content for presentation, based on a second network quality value and a size of the auxiliary display; wherein the second version of the content has a higher resolution than a first version of the content and requires a higher bandwidth provided by the communication link.

In one or more embodiments, to selectively present the content for consumption, the processor: identifies from the metadata that the content includes a display preference corresponding to characteristics of the auxiliary display and the other electronic device that are not provided by the first display and the communication device; and in response to the other electronic device not being communicatively connected to the communication device, defers presentation of the content until after a connection to the other electronic device is detected.

Figure 6:
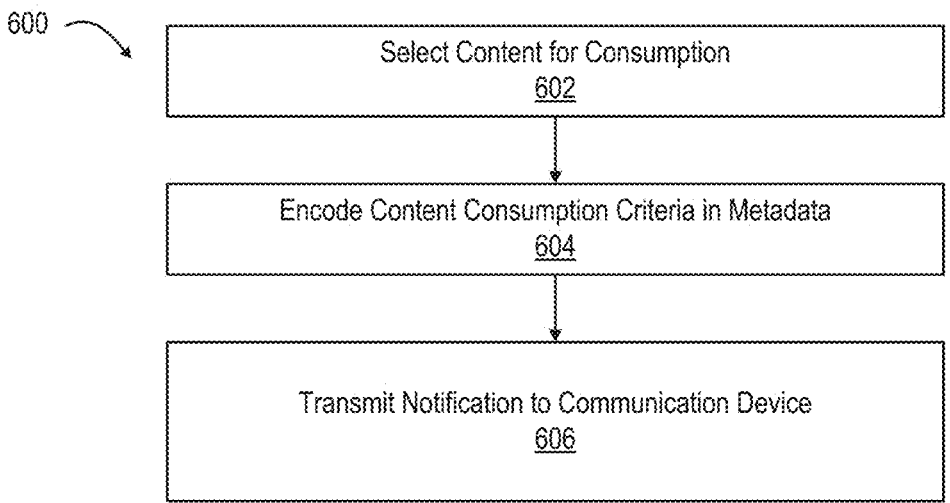
FIG. 6 depicts a flowchart of a method performed by a notification server to encode content consumption criteria in metadata of a notification, according to one or more embodiments.

Referring now to the flowcharts and beginning with FIG. 6, which provides is a flow diagram presenting an embodiment of a method 600 performed by a notification server to encode content consumption criteria in metadata of a notification, according to one or more embodiments. The descriptions of method 600 depicted in FIG. 6 is provided with general reference to the specific components and/or features illustrated within the preceding FIGS. 1-5 and specifically FIGS. 1, 2A, and 3. Specific components referenced in the methods depicted in FIG. 6 may be identical or similar to components of the same name used in describing preceding FIGS. 1-5. In one or more embodiments, processor 232 (FIG. 2A) configures server 230 (FIG. 1) to provide the described functionality of method 600 (FIG. 6) by executing program code for one or more modules or applications provided within system memory 234 of server 230.

FIG. 6 depicts a flowchart of a method 600 by which content consumption criteria is encoded in metadata of a notification being generated by a notification server for presentation on a consumer device, according to one or more embodiments. The method begins at block 602 at which the method includes selecting content for consumption. The content can include a notification and/or content associated with a notification. Content associated with a notification can include additional video, audio, and/or images that are retrieved and rendered upon a user action, such as tapping, swiping, clicking, or otherwise selecting the notification. Method 600 includes, at block 604, encoding content consumption criteria in metadata. According to one or more embodiments, prior to the encoding, the method includes determining one or more presentation parameters associated with presentation of the notification or associated content. The presentation parameters include recommended characteristics for at least one of display size, a display resolution, and an audio output device selection. The method then includes providing an indication of the one or more presentation parameters within the metadata. In one or more embodiments, the content consumption criteria can be rule-based. The rules can be defined a priori based on content attributes. As an example, content that includes video exceeding a given resolution can have content consumption criteria specifying a preferred network quality. Method 600 includes, at block 606, transmitting the notification with the encoded metadata to a communication device. The notification may be transmitted via a cellular network, WiFi network, or other suitable network.

In one or more specific implementations of the above-described embodiments, the method includes selecting content for consumption at a second device communicatively coupled to a computing device. The method includes encoding into metadata associated with the content, content consumption criteria related to at least one of a network quality and a second device capability for presenting the content at the second device. The method incudes transmitting a notification to the second device, the notification including metadata associated with the content. The metadata configures the second device to determine at least one of (i) a timing for presenting the content for consumption at the second device and (ii) presentation parameters related to the content based on the content consumption criteria.

In one or more embodiments, the encoding of content consumption criteria into the metadata includes including within the network quality, at least one of, connection type, bandwidth, and latency for accessing and presenting the content. In one or more embodiments, the encoding includes providing at least one connection type from among WiFi, cellular, satellite, and Bluetooth connection that can be used to access and present the content. In one or more embodiments, selecting content for consumption at the second device can include generating a second version of the selected content, where the second version of the selected content has reduced network bandwidth requirements than the original content that was selected for consumption. The method then includes incorporating, into the metadata, a reference to access and present the second version of content as alternate content to access and present, in response to the second device not being able to provide the content consumption criteria required for presenting the original content at the second device. In one or more embodiments, the encoding includes: determining a presentation deadline for surfacing the notification to the second device; and incorporating the presentation deadline within the metadata.

According to one or more embodiment, the method includes identifying at least one fallback action rule to be followed by the second device in response to not presenting the notification before expiration of the presentation deadline; and incorporating the fallback action rule within the metadata. In one or more implementations, encoding the fallback action rule includes incorporating one or more of abort, proceed-regardless, and proceed with surfacing alternate media as a fallback action to implement in response to not presenting the notification before expiration of the presentation deadline. In one or more embodiments, the encoding can further include determining one or more presentation parameters associated with presentation of the notification or associated content, the presentation parameters including recommended characteristics for at least one of display size, a display resolution, and an audio output device selection. The method then includes providing an indication of the one or more presentation parameters within the metadata.

According to one or more embodiments, a computer program product includes: a non-transitory computer readable storage device having stored thereon program code which, when executed by at least one processor of an electronic device, enables the electronic device to provide functionality of the above-described method.

Figure 7:
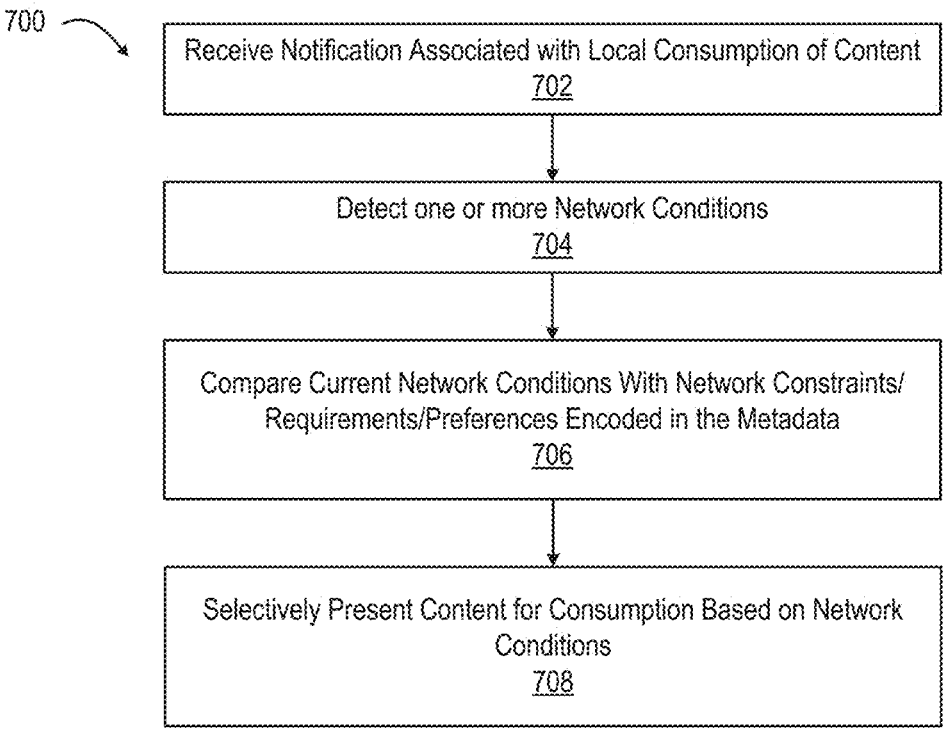
FIG. 7 depicts a flowchart of a method by which a communication device selectively presents notification content based on network conditions, according to one or more embodiments.
Figure 8:
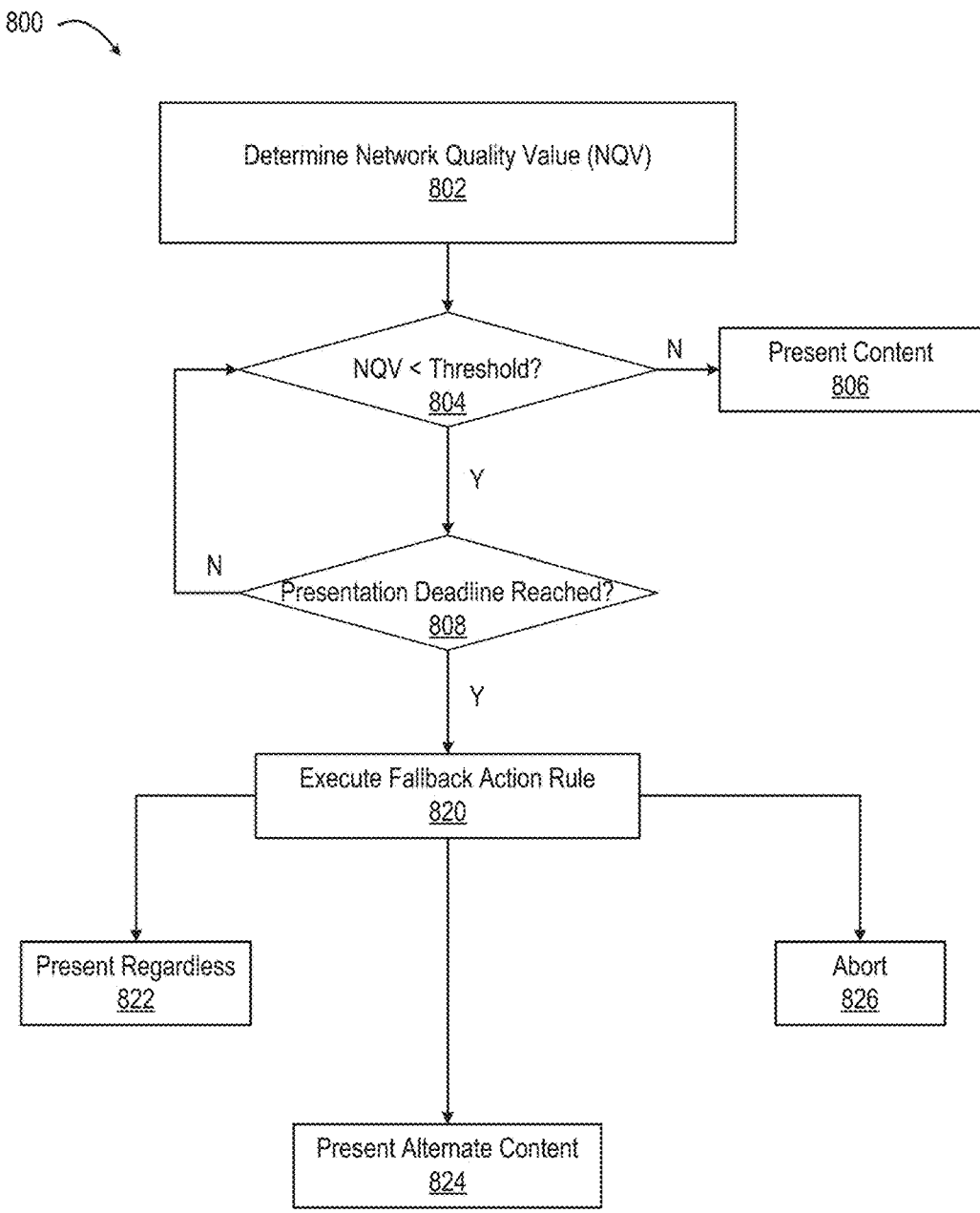
FIG. 8 depicts a flowchart illustrating additional details of a method by which notification content or alternate content is selectively presented based on network conditions, according to one or more embodiments.

FIG. 7 depicts a flowchart of a method 700 by which a communication device selectively presents notification content based on network conditions, according to one or more embodiments. FIG. 8 depicts a flowchart illustrating additional details of a method 800 by which notification content or alternate content is selectively presented based on network conditions, according to one or more embodiments. FIG. 9 depicts a flowchart of a method 900 by which a communication device is configured to receive notifications, and detect both network conditions and device characteristics to use as criteria for selectively presenting content for consumption. The descriptions of the methods depicted in FIGS. 7-9 are provided with general reference to the specific components and/or features illustrated within the preceding FIGS. 1-5. Specific components referenced in the methods depicted in FIGS. 7-9 may be identical or similar to components of the same name used in describing preceding FIGS. 1-5. In one or more embodiments, processor 102 (FIG. 1) configures communication device 110 (FIG. 1) to provide the described functionality of method 700 (FIG. 7), method 800 (FIG. 8), and method 900 (FIG. 9) by executing program code for one or more modules or applications provided within system memory 120 of communication device 110.

Beginning with FIG. 7, there is depicted a flowchart of a method 700 by which content is selectively presented based on network conditions, according to one or more embodiments. Method 700 begins at block 702 at which the method includes receiving a notification associated with local consumption of content. Method 700 includes, at block 704, detecting one or more network conditions. The network conditions can include, but are not limited to, received signal strength, error rate, bandwidth, latency, signal-to-noise ratio (SNR), packet retransmission rates, and so on. The network conditions can include conditions at the physical layer, and/or higher-level protocols, such as at a TCP layer (transmission control protocol layer). In some embodiments, the communication device may periodically perform a speed test, such as an iperf test, to check speed between the communication device and a corresponding server (e.g., server 230 of FIG. 2A and/or FIG. 2B). Method 700 includes, at block 706, comparing the current network conditions with network constraints in the metadata. At block 708, the method includes selectively presenting content for consumption based on network conditions. In one or more embodiments, the communication device parses the metadata to determine if the notification should be surfaced immediately, or be deferred, based on the current network conditions that the communication device is experiencing. According to one or more embodiments, the method can include determining a network quality value and delaying presentation of the content until the network quality value exceeds a predetermined minimum quality threshold.

The above-described method 700 presents features of the second aspect of the disclosure. In one or more specific implementations, method 700 includes receiving, from a network connected device, a notification associated with local consumption of content available for presentation by a communication device that has a processor. The notification includes metadata associated with the content, the metadata encoding content consumption criteria related to preferences for when and how to present the content, in part based on network conditions at the communication device. The method includes detecting one or more current network conditions and comparing the current network conditions with network constraints within the content consumption criteria encoded in the metadata. The method includes selectively presenting the content for consumption at one or more of a time or in a format determined, at least in part, by the detected one or more network conditions. In one or more embodiments, the selectively presenting of the content includes determining a network quality value and delaying presentation of the content until the network quality value exceeds a predetermined minimum quality threshold.

FIG. 8 depicts a flowchart illustrating additional details of a method 800 by which notification content or alternate content is selectively presented based on network conditions, according to one or more embodiments. In one or more embodiments, processor 102 (FIG. 1) configures communication device 110 (FIG. 1) to perform methods to evaluate content consumption criteria and execute one or more fallback action rules, based on the content consumption criteria.

Method 800 begins at block 802, where the communication device determines a network quality value (NQV). In one or more embodiments, a tally of points is computed, where one or more points are tallied for each criterion satisfied. As an example, a point can be tallied for each of current network conditions of latency, bandwidth, and connection type, satisfying criteria specified in the metadata (e.g., 310 of FIG. 3). If all three conditions are met, a network quality value of three is computed. If, as an example, the latency criteria is not met, but the bandwidth and connection type are met, then a network quality value of two is computed. In one or more embodiments, coefficients can be used to weight certain criteria. As an example, the bandwidth can have a coefficient with a value of 5, such that five points are tallied if the bandwidth condition is satisfied, while a lower coefficient can be applied to the other criteria. In this way, a given criterion, such as bandwidth, can be given a greater importance than other criteria, enabling content presentation rules to be fine-tuned for particular devices, network conditions, and/or types of notifications and/or associated content.

Method 800 continues to block 804, where a check is made to determine if the network quality value is below a predetermined threshold. In embodiments, a processor within the communication device determines that a current network quality value is below a first threshold quality value to support successful presentation of a full version of the content. If, at block 804, the network quality value is not below the predetermined threshold, then the method 800 continues to block 806, where the content is presented. This can include surfacing a notification, and/or presenting additional associated content such as video, audio, and/or image data. If, at block 804, the network quality value is below the predetermined threshold, then the method continues to block 808, where a check is made to determine if the presentation deadline is reached. In one or more embodiments, the presentation deadline is specified in the metadata, such as shown at 330 of FIG. 3. If the presentation deadline is not reached at block 808, the method returns to block 804 to continuously or periodically check the network quality value.

If the presentation deadline is reached at block 808, then the method continues to block 820 where a fallback action rule is executed. The fallback action rule includes an action to take regarding a notification and/or associated content once a presentation deadline time is reached. As an example, a notification for a flash sale at a retailer can be pushed to a communication device at 9:00am. The notification may have a presentation deadline of 11:00am. If, at 9:00am, the network quality is below the threshold, the communication device defers the presentation of the notification. If, at 10:04am, the network quality improves to a level where the network quality exceeds the predetermined threshold, the notification is presented at 10:04am. If, however, the network quality does not exceed the predetermined threshold by 11:00am, then the fallback action rule is executed. In the case of time-critical information, such as a sale that is happening that day, a likely fallback rule can include presenting the notification regardless of the network quality value (block 822). This fallback action rule causes the communication device to surface the notification anyway, even though the network quality value is below the predetermined threshold. Another possible fallback action rule can include presenting alternate content, at block 824. The alternate content can include content that has lower network requirements for a satisfactory user experience. As an example, the alternate content can include text-only content, and/or lower resolution of associated audio, video, and/or image content. Another possible execution fallback rule includes abort (block 826). The abort fallback rule causes the communication device to discard the notification if the presentation deadline is reached and the network quality value never reached a specified predetermined quality threshold.

According to one or more embodiments, the selectively presenting includes identifying from the metadata that a second version of the content that has lower network requirements is available. The method 800 includes determining that a current network quality value is below a first threshold quality value to support successful presentation of a full version of the content. The method includes selecting the second version of the content for presentation, based on the current network quality value being below the first threshold quality value and a current time being an appropriate time for surfacing the content for user consumption.

According to one or more specific implementations of the one or more embodiments, selecting the second version of the content includes selecting one or more of a smaller version of the content, a text version of the content, a less bandwidth intensive version of the content, and a less resource intensive version of the content. In one or more embodiments, selectively presenting the content incudes identifying a time corresponding to the network quality value exceeding a predetermined threshold and presenting the content at the identified time. In one or more embodiments, selectively presenting the content further includes applying a fallback action rule for the content, where the fallback action rule specifies one or more actions to be executed by the processor in response to reaching a presentation deadline.

In one or more embodiments, the method comprises selectively presenting the notification on the second display device based on the content consumption criteria encoded within the metadata. In one or more embodiments, selectively presenting the content further includes: receiving, within the metadata, rendering criteria for displays that are best for rendering the content; determining which of a local display and the second display device provides the rendering criteria identified by the metadata; and outputting the content on a selected one of the local display and the second display device that provides the rendering criteria. In one or more embodiments, the determining which of the local display and the second display device provides the rendering criteria further comprises: in response to the rendering criteria indicating that the content is better rendered on a larger display: selecting a larger of the local display and the second display device; and rendering the notification and associated content on the larger display.

According to one or more embodiments associated with the second aspect of the disclosure, there is provided a computer program product including a non-transitory computer readable storage device having stored thereon program code which, when executed by at least one processor of an electronic device, enables a communication device to provide functionality of the above-described methods:

FIG. 9 depicts a flowchart illustrating additional details of a method 900 by which content is selectively presented on an auxiliary display device, in part based on network conditions at communication device 110 and/or device characteristics of one or both of communication device 110 and auxiliary display device 170, according to one or more embodiments. In one or more embodiments, an auxiliary display can be coupled to a communication device via a wired or wireless interface. Such examples of a connected auxiliary display are shown at 242 of FIG. 2B, as well as 502 of FIG. 5. The method 900 begins at block 902 at which the method includes receiving a notification associated with local consumption of content. Method 900 includes, at block 904, detecting one or more network conditions. The network conditions can include, but are not limited to, received signal strength, error rate, bandwidth, latency, signal-to-noise ratio (SNR), packet retransmission rates, and so on. The network conditions can include conditions at the physical layer, and/or higher-level protocols, such as at a TCP layer (transmission control protocol layer).

Method 900 includes, at block 906, detecting one or more device characteristics. The device characteristics can include device characteristics of an auxiliary display. In one or more embodiments, the device characteristics can be obtained via an EDID (Extended Display Identification Data) structure, via HDMI (High-Definition Multimedia Interface), DisplayPort, and/or other suitable protocol. The device characteristics can include, but are not limited to, resolution, aspect ratio, refresh rate, screen size, and/or other device characteristics. One or more of the aforementioned device characteristics may be used as inputs to logic for presentation of notifications. At block 908, the method includes selectively presenting content for consumption based on network conditions and the device characteristics. In one or more embodiments, the communication device parses the metadata to determine if the notification should be surfaced immediately, or deferred, based on the current network conditions that the communication device and/or a coupled auxiliary device is experiencing.

Figure 10:
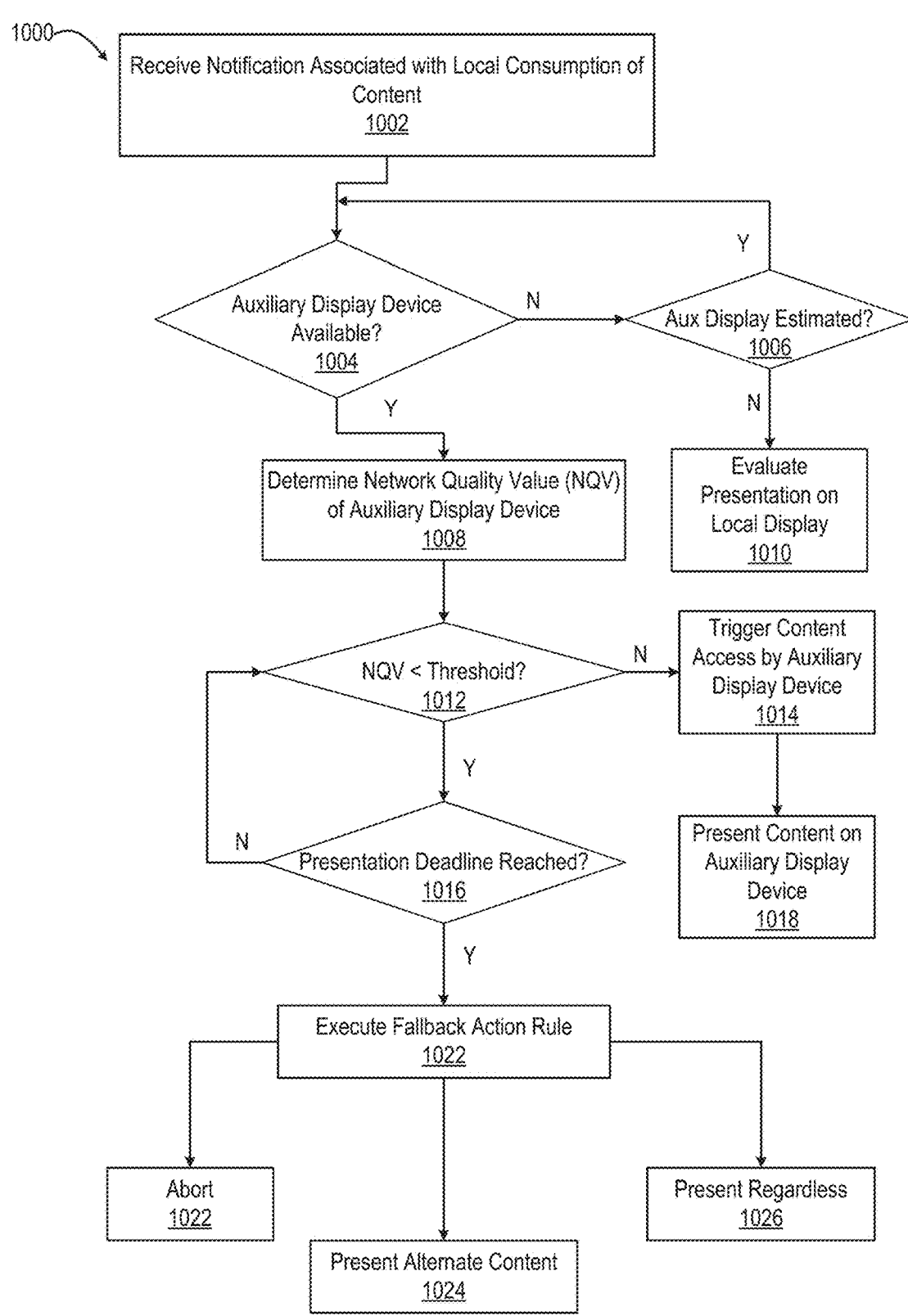
FIG. 10 depicts a flowchart of additional details for a method by which a communication device selectively displays content on an auxiliary display device, according to one or more embodiments.

FIG. 10 illustrates a flowchart depicting method 1000 by which a communication device triggers a second device processor to retrieve and display content on an auxiliary display device, based on network conditions of the second device, according to one or more embodiments. In one or more embodiments, processor 102 (FIG. 1) triggers second device processor 244 (FIG. 2B) to provide the described functionality of method 1000 (FIG. 10), by executing program code for one or more modules or applications provided within system memory 120 of communication device 110. Additionally, processor 244 (FIG. 2B) configures other electronic device 242 (FIG. 2B), to provide the content retrieval and presentation features of method 1000 (FIG. 10), by executing program code for one or more modules or applications provided within system memory 249 of communication device 242, in response to receiving a trigger from processor 102 of communication device 110.

The method begins at block 1002, at which the method includes receiving a notification associated with local consumption of content. Method 1000 includes, at block 1004, a check to determine if an auxiliary display device is available. If, at block 1004, an auxiliary device is not available, the method 1000 continues to block 1006, where a check is made to determine if an auxiliary device is estimated to be present at a later time. In one or more embodiments, the estimation can be based on usage history, and/or based on machine learning predictions. As an example, if a user has a tendency to connect his/her communication device to an auxiliary display every day at 7:00pm, then a notification that is received by a communication at 6:00pm may be deferred until after 7:00pm, to again check if the auxiliary display is connected. Accordingly, if, at block 1006, the processor estimates that an auxiliary display will be connected at a future time, the method returns to block 1004. If, at block 1006 the processor estimates that an auxiliary display will not be connected at a future time, the processor evaluates presentation of the notification on the local display at block 1010. Thus, in one or more embodiments, to selectively present the notification on the auxiliary display, the processor: defers presentation of the notification while the other electronic device is not connected to the communication device; identifies, via the interface, when the other electronic device is connected to the communication device; and renders the notification on the auxiliary display of the other electronic device in response to identifying connection of the other electronic device. Furthermore, one or more embodiments can include estimating a time for a connection event corresponding to the other electronic device to be connected to the communication device and deferring presentation of the content until after the connection event. The processing of block 1010 can include features of the methods depicted in FIG. 7 and FIG. 8. Other embodiments can utilize machine learning and/or heuristics to surface notifications based on other additional criteria. As an example, notifications based on user activities. As an example, a notification can be deferred until a time when a user typically leaves work. Another example can include surfacing a notification related to exercise when it is determined or inferred that a user is exercising. Other use cases are possible in one or more other embodiments.

If, at block 1004, an auxiliary display device is available, the method continues to 1008, where a network quality value of an auxiliary display device is determined. The method 1000 continues to block 1012, where the network quality value of the auxiliary display device is compared to a predetermined threshold. If, at block 1012, the network quality value of the auxiliary display device is not below the threshold, then the method proceeds to block 1014, where the auxiliary display device is triggered to retrieve content directly from a communication network (e.g., such as via access point 248 of FIG. 2B). The method 1000 then continues, at block 1018, to present content on the auxiliary display device, such as depicted at 204 in FIG. 2B, and 508 of FIG. 5. If, at block 1012, the network quality value is below the predetermined threshold, the method 1000 continues to block 1016, where a check is made to determine if the presentation deadline is reached. If the presentation deadline is not reached at block 1016, the method returns to block 1012 to continuously or periodically check the network quality value. If the presentation deadline is reached at block 1016, then the method continues to block 1022 where a fallback action rule is executed. Similar to as described and illustrated in FIG. 8, the fallback rule can include an abort rule at block 1022, a present alternate content rule at bock 1024, and/or a present regardless rule at block 1026. In one or more embodiments, at block 1008, if the auxiliary device is not a network enabled device (e.g., a non-networked computer monitor), then the network quality value of the communication device may be used for the evaluation at block 1012.

Figure 11:
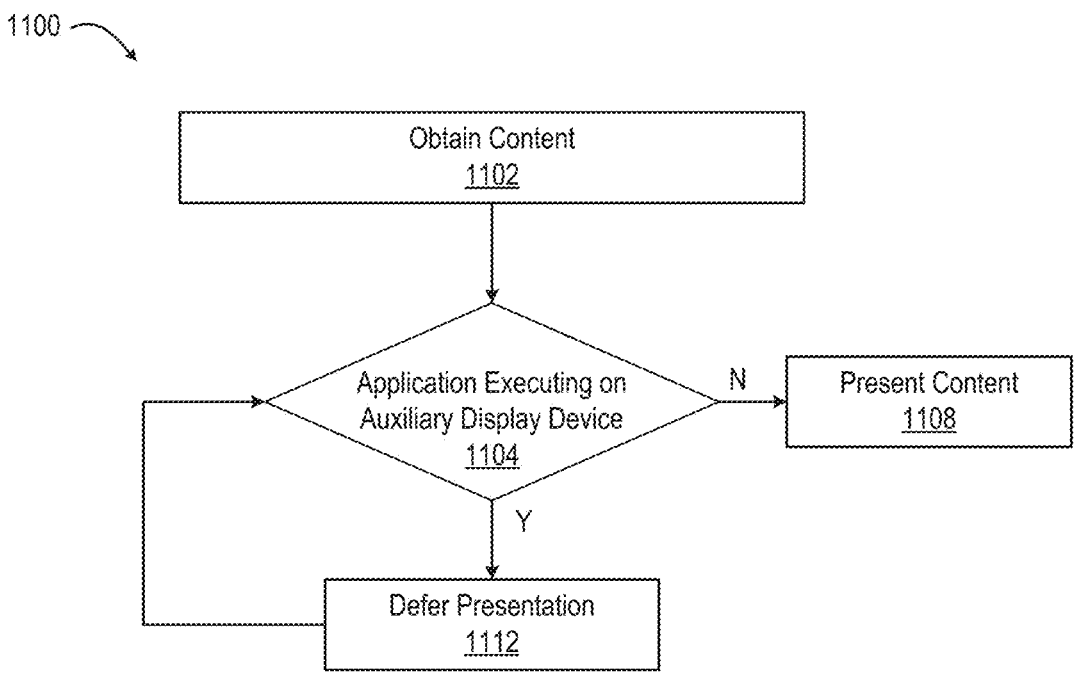
FIG. 11 depicts a flowchart of additional details for a method by which a communication device defers display of content on an auxiliary display device based on application execution, according to one or more embodiments.
Figure 12:
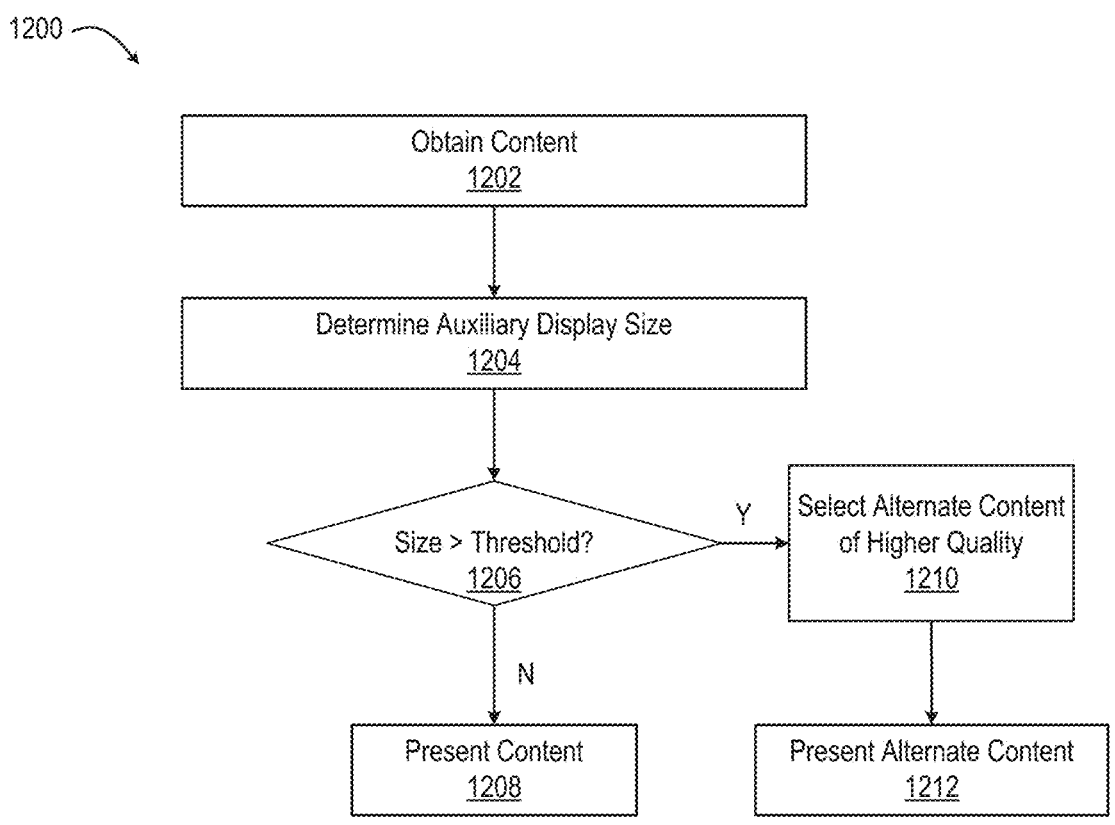
FIG. 12 depicts a flowchart of additional details for a method by which a communication device displays content on an auxiliary display device based on device characteristics, according to one or more embodiments.

Referring now to the remaining flow charts, FIG. 11 depicts a flowchart of additional details for a method 1100 by which a communication device defers display of content on an auxiliary display device based on application execution, according to one or more embodiments. FIG. 12 depicts a flowchart of a method 1200 by which a communication device displays content on an auxiliary display device based on device characteristics, according to one or more embodiments. In one or more embodiments, processor 102 (FIG. 1) configures communication device 110 (FIG. 1) to provide the described functionality of method 1100 (FIG. 11) and method 1200 (FIG. 12) by executing program code for one or more modules or applications provided within system memory 120 of communication device 110 to perform methods to evaluate content consumption criteria and defer presentation of a notification and/or associated content, based on application execution and device characteristics, respectively. Additionally, processor 244 (FIG. 2B) configures other electronic device 242 (FIG. 2B), to provide at least some of the described functionality of method 1100 (FIG. 11) including communicating a list of one or more applications executing on the other electronic device 242 to the communication device 110.

The method begins at block 1102, where content is obtained from a content source, such as a network server. The content can include one or more notifications and/or associated content. The notifications and/or content can be served from a server such as indicated at 230 in FIG. 2A and/or a content repository such as indicated at 277 of FIG. 2A. The location of the content can be specified in the metadata, such as indicated at 340 of FIG. 3. The method 1100 continues to block 1104, where a check is made to determine if an application is executing on an auxiliary display device 502. In embodiments, this check can be made by the communication device accessing a list of tasks and/or processes currently executing on the auxiliary display device. and/or inspecting one or more temporary files on the auxiliary display device that are indicative of a currently executing application. In one or more embodiments, specified applications, such as web conferencing applications, streaming applications, and/or other applications can be stored in a data structure on the communication device. If an application from among those identified in the data structure is executing, then the notification can be deferred until the application is no longer executing. In this way, a user is not disturbed by notifications while participating in a web conference, or watching a movie, for example. Accordingly, if at 1104, the processor determines that a specified application is executing, then the method 1100 continues to block 1112, where presentation of the notification is deferred, and the method returns to block 1104 to periodically or continuously check if the application is executing on the auxiliary display device. If, at block 1104, the processor determines that the specified application(s) are not executing on the auxiliary display device, then method 1100 continues to block 1108 where the content is presented.

Thus, in one or more embodiments, to selectively present the content on the auxiliary display, the processor: determines if a specific application is executing on the other electronic device; defers presentation of the content in response to determining that the specific application is executing; and in response to detecting a termination event for the specific application, presents the content on the auxiliary display. In one or more embodiments, to selectively present the content on the auxiliary display, the processor: selects a second version of the content for presentation, based on a second network quality value and a size of the auxiliary display, where the second version of the content has a higher resolution than a first version of the content and requires a higher bandwidth provided by the communication link.

FIG. 12 depicts a flowchart of additional details for a method 1200 by which a communication device displays content on an auxiliary display device based on device characteristics, according to one or more embodiments. The method begins at block 1202, where content is obtained. The content can be obtained via a server (such as 230 in FIG. 2B, or a content repository such as 277 in FIG. 2B. The content can be downloaded and/or streamed using a variety of network protocols, including, but not limited to, Hypertext Transfer Protocol (HTTP), Real-time Transport Protocol (RTP), Real Time Streaming Protocol (RTSP), and/or other protocols. The content can include one or more notifications and/or associated content. The notifications and/or content can be served from a server such as indicated at 230 in FIG. 2A and/or a content repository such as indicated at 277 of FIG. 2A. The location of the content can be specified in the metadata, such as indicated at resource identifiers section 340 in metadata 300 of FIG. 3. The method 1200 continues to block 1204, where an auxiliary display size is obtained. In one or more embodiments, the auxiliary display size is obtained by reading an EDID structure from a connected auxiliary display device. The method 1200 then continues to block 1206, where the auxiliary display size is compared to a predetermined threshold. In one or more embodiments, the predetermined threshold is encoded in metadata associated with a notification, such as indicated at 322 in FIG. 3. In one or more embodiments, if at block 1206, the size exceeds a predetermined threshold, then the method 1200 continues to block 1210, where alternate content of a higher quality is selected. The alternate content is then presented at block 1212. If instead, at block 1206, the size does not exceed the predetermined threshold, then the original content (or a reduced quality version of the content) is presented at block

1208. The aforementioned embodiments are well-suited for notifications that have alternate versions of associated content at a higher quality than the default content. As an example, a notification may have 1080p video content associated with it as a default. However, an 8K version of the video content may exist, and the processor determines that the auxiliary display exceeds a predetermined size (e.g., 150 cm, measured diagonally), then disclosed embodiments may present the higher-quality 8K content instead of, or in addition to, the default 1080p content. In this way, disclosed embodiments can present both reduced quality and enhanced quality versions of notifications and/or associated content based on network conditions and in some embodiments, also taking device characteristics into consideration.

According to one or more embodiments corresponding to the third aspect of the disclosure, the method 1000/1100 can include: receiving, by a communication device from a network device, a notification associated with consumption of content available for presentation by the communication device on a display device from among a first display integrated within a physical structure of the communication device and a second display of a connected device. The second display is configurable to be an auxiliary display for the communication device. The notification includes metadata associated with the content, the metadata encoding content consumption criteria related to preferences for when and how to present the content, in part based on network conditions and device resource characteristics at the communication device. The method includes detecting one or more network conditions and device resource characteristics corresponding to the content consumption criteria encoded in the metadata. The method includes selectively enabling presentation of the content on the auxiliary display for consumption based, at least in part, on the detected one or more network conditions and device resource characteristics.

In one or more embodiments, selectively enabling presentation further includes: identifying that a network quality value of the communication device is below a threshold quality value required to present the content; receiving a second network quality value for a communication link between the other electronic device and at least one network device from which the content can be sourced; comparing the second network quality value with a threshold quality value; and triggering the processor of the other electronic device to directly access the content from the at least one network device and present the content on the auxiliary display, in response to the second network quality value being greater than the threshold quality value, while the network quality value of the communication device is below the threshold quality value.

In one or more embodiments, the method includes delaying presentation of the content until at least one of the network quality value and the second network quality value exceeds a predetermined threshold. In one or more embodiments, the metadata identifies a display characteristic that is met by the auxiliary display, and the method includes: deferring presentation of the notification while the other electronic device is not connected to the communication device; and identifying via the interface, when the other electronic device is connected to the communication device. The method further includes rendering the notification in an enlarged size on the auxiliary display of the other electronic device in response to identifying connection of the other electronic device. One or more embodiments can further include: identifying a preferred time for presentation of the notification; triggering retrieval of the notification and content utilizing the communication link while a second network quality value for the communication link exceeds a predetermined threshold at the preferred time; and rendering the notification on the auxiliary display of the other electronic device, further in response to determining that the second network quality value exceeds the predetermined threshold at the preferred time.

In one or more embodiments, selectively enabling presentation of content further includes: determining if a specific application is executing on the other electronic device; deferring presentation of the content in response to determining that the specific application is executing; and in response to detecting a termination event for the specific application, presenting the content on the other electronic device. In one or more embodiments, selectively enabling presentation of content further includes: selecting a second version of the content for presentation, based on a second network quality value and a size of the auxiliary display of the other electronic device, where the second version of the content has a higher resolution than a first version of the content.

In one or more embodiments, selectively enabling presentation of content further includes: identifying from the metadata that the content includes a display preference corresponding to the other electronic device; estimating a time for a connection event corresponding to the other electronic device to be connected to the communication device; and deferring presentation of the content until after the connection event.

According to one or more embodiments of the disclosure, there is provided a computer program product comprising: a non-transitory computer readable storage device having stored thereon program code which, when executed by at least one processor of an electronic device, enables the electronic device to provide functionality of one or more of the above-presented methods.

In addition to network quality, one or more embodiments may further include network plan analysis. As an example, some wireless plans may have unlimited data, whereas other wireless plans may have a fixed amount of data for consumption, after which, additional charges are incurred. Additionally, some wireless plans may have a service area, outside of which, additional roaming charges are applied. One or more embodiments may further include network plan criteria in the analysis. As an example, one or more embodiments may defer notifications while a communication device is operating in a roaming status.

As can now be appreciated, disclosed embodiments improve the user experience regarding notifications and associated content. By considering network conditions, and/or device characteristics of a connected auxiliary display, disclosed embodiments improve the likelihood of user engagement with a notification, thereby increasing monetization opportunities for content creators, advertisers, service providers, and/or other stakeholders.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A communication device comprising:
a wireless communication subsystem which enables the communication device to communicatively connect via a network to at least one network device providing content for local presentation at the communication device;
a first display integrated within a physical structure of the communication device;
an interface by which the communication device communicatively connects to another electronic device having a second display that is configurable to be an auxiliary display for the communication device, the interface enabling the communication device to mirror a user interface of the communication device on the auxiliary display and present received notifications and content on the auxiliary display;
a memory storing a notifications module for surfacing notifications received during operation of the communication device; and
a processor communicatively coupled to the wireless communication subsystem, the auxiliary display, and the memory and which processes instructions of the notifications module, which causes the processor to:
receive, from the network device, a notification associated with consumption of content available for presentation by the communication device, the notification including metadata associated with the content, the metadata encoding content consumption criteria related to preferences for when and how to present the content, in part based on network conditions and device resource characteristics at the communication device;
detect one or more network conditions and device resource characteristics corresponding to the content consumption criteria encoded in the metadata; and selectively enable presentation of the content on the auxiliary display, in lieu of the first display, based, at least in part, on the detected one or more network conditions and device resource characteristics.

2. The communication device of claim 1, wherein:

the other electronic device comprises a second processor and a communication link to the at least one network device that can be selectively utilized for accessing and presenting the content; and to selectively present the content on the auxiliary display, the processor:

identifies that a network quality value of the communication device is below a threshold quality value required to present the content;

receives a second network quality value for the communication link between the other electronic device and the at least one network device;

compares the second network quality value with a threshold quality value; and triggers the second processor of the other electronic device to directly access the content from the at least one network device and present the content on the auxiliary display, in response to the second network quality value being greater than the threshold quality value, while the network quality value of the communication device is below the threshold quality value.

3. The communication device of claim 2, wherein the processor delays presentation of the content until at least one of the network quality value and the second network quality value exceeds a predetermined threshold.

4. The communication device of claim 1, wherein the metadata identifies a display characteristic that is met by the auxiliary display, and to selectively present the notification on the auxiliary display, the processor:

defers presentation of the notification while the other electronic device is not connected to the communication device;

identifies when the other electronic device is connected to the communication device; and renders the notification on the auxiliary display of the other electronic device in response to identifying connection of the other electronic device.

5. The communication device of claim 2, wherein the processor:

identifies a preferred time for presentation of the notification;

triggers retrieval of the notification and associated content utilizing the communication link while a second network quality value for the communication link exceeds a predetermined threshold at the preferred time; and renders the notification on the auxiliary display of the other electronic device, further in response to determining that the second network quality value exceeds the predetermined threshold at the preferred time.

6. The communication device of claim 1, wherein to selectively present the content on the auxiliary display, the processor:

determines if a specific application is executing on the other electronic device;

defers presentation of the content in response to determining that the specific application is executing; and in response to detecting a termination event for the specific application, presents the content on the auxiliary display.

7. The communication device of claim 2, wherein to selectively present the content on the auxiliary display, the processor:

selects a second version of the content for presentation, based on a second network quality value and a size of the auxiliary display;

wherein the second version of the content has a higher resolution than a first version of the content and requires a higher bandwidth provided by the communication link.

8. The communication device of claim 1, wherein to selectively present the content for consumption, the processor:

identifies from the metadata that the content includes a display preference corresponding to characteristics of the auxiliary display and the other electronic device that are not provided by the first display and the communication device; and in response to the other electronic device not being communicatively connected to the communication device, defers presentation of the content until after a connection to the other electronic device is detected.

9. A method comprising:

receiving, by a communication device from a network device, a notification associated with consumption of content available for presentation by the communication device on a display device from among a first display integrated within a physical structure of the communication device and a second display of a connected device, the second display configured to be an auxiliary display for the communication device, the notification including metadata associated with the content, the metadata encoding content consumption criteria related to preferences for when and how to present the content, in part based on network conditions and device resource characteristics at the communication device;

detecting one or more network conditions and device resource characteristics corresponding to the content consumption criteria encoded in the metadata; and selectively enabling presentation of the content on the auxiliary display for consumption based, at least in part, on the detected one or more network conditions and device resource characteristics.

10. The method of claim 9, wherein the selectively enabling presentation further comprises:

identifying that a network quality value of the communication device is below a threshold quality value required to present the content;

receiving a second network quality value for a communication link between the other electronic device and at least one network device from which the content can be sourced;

comparing the second network quality value with a threshold quality value; and triggering a processor of the other electronic device to directly access the content from the at least one network device and present the content on the auxiliary display, in response to the second network quality value being greater than the threshold quality value, while the network quality value of the communication device is below the threshold quality value.

11. The method of claim 10, further comprising delaying presentation of the content until at least one of the network quality value and the second network quality value exceeds a predetermined threshold.

12. The method of claim 10, wherein the metadata identifies a display characteristic that is met by the auxiliary display, further comprising:

deferring presentation of the notification while the other electronic device is not connected to the communication device;

identifying when the other electronic device is connected to the communication device; and rendering the notification in an enlarged size on the auxiliary display of the other electronic device in response to identifying connection of the other electronic device.

13. The method of claim 12, further comprising:

identifying a preferred time for presentation of the notification;

triggering retrieval of the notification and content utilizing the communication link while a second network quality value for the communication link exceeds a predetermined threshold at the preferred time; and rendering the notification on the auxiliary display of the other electronic device, further in response to determining that the second network quality value exceeds the predetermined threshold at the preferred time.

14. The method of claim 10, wherein selectively enabling presentation of content further comprises:

determining if a specific application is executing on the other electronic device;

deferring presentation of the content in response to determining that the specific application is executing; and in response to detecting a termination event for the specific application, presenting the content on the other electronic device.

15. The method of claim 10, wherein selectively enabling presentation of content further comprises:

selecting a second version of the content for presentation, based on a second network quality value and a size of the auxiliary display of the other electronic device;

wherein the second version of the content has a higher resolution than a first version of the content.

16. The method of claim 10, wherein selectively enabling presentation of content further comprises:

identifying from the metadata that the content includes a display preference corresponding to the other electronic device;

estimating a time for a connection event corresponding to the other electronic device to be connected to the communication device; and deferring presentation of the content until after the connection event.

17. A computer program product comprising:

a non-transitory computer readable storage device having stored thereon program code which, when executed by at least one processor of an electronic device, enables the electronic device to provide functionality of:

receiving, by a communication device, a notification associated with consumption of content available for presentation by the communication device on a display device from among a first display integrated within a physical structure of the communication device and a second display of a connected device, the second display configurable to be an auxiliary display for the communication device, the notification including metadata associated with the content, the metadata encoding content consumption criteria related to preferences for when and how to present the content, in part based on network conditions and device resource characteristics at the communication device;

detecting one or more network conditions and device resource characteristics corresponding to the content consumption criteria encoded in the metadata; and selectively enabling presentation of the content on the auxiliary display for consumption at a time determined, at least in part, by the detected one or more network conditions and device resource characteristics.

18. The computer program product of claim 17, wherein the program code for selectively enabling presentation comprises instructions that configure the at least one processor to perform functions comprising:

identifying that a network quality value of the communication device is below a threshold quality value required to present the content;

receiving a second network quality value for a communication link between the other electronic device and the at least one network device;

comparing the second network quality value with a threshold quality value; and triggering the at least one processor of the other electronic device to directly access and present the content on the auxiliary display, in response to the second network quality value being greater than the threshold quality value while the network quality value of the communication device is below the threshold quality value.

19. The computer program product of claim 17, wherein the program code for selectively enabling presentation comprises instructions that configure the at least one processor to perform functions comprising:

determining if a specific application is executing on the other electronic device;

deferring presentation of the content in response to determining that the specific application is executing; and in response to detecting a termination event for the specific application, presenting the content on the other electronic device.

20. The computer program product of claim 17, wherein the program code for selectively enabling presentation comprises instructions that configure the at least one processor to perform functions comprising:

identifying from the metadata that the content includes a display preference corresponding to characteristics of the auxiliary display and the other electronic device that are not provided by the first display and the communication device; and in response to the other electronic device not being communicatively connected to the communication device, deferring presentation of the content until after a connection to the other electronic device is detected.

* * * * *